(12) United States Patent
Imafuku

(10) Patent No.: US 9,751,404 B2
(45) Date of Patent: Sep. 5, 2017

(54) TRANSFER

(71) Applicant: TOYOTA JIDOSHA KABUSHIKI KAISHA, Toyota-shi, Aichi-ken (JP)

(72) Inventor: Mizuki Imafuku, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/277,464

(22) Filed: Sep. 27, 2016

(65) Prior Publication Data
US 2017/0087985 A1  Mar. 30, 2017

(30) Foreign Application Priority Data

Sep. 29, 2015  (JP) ................. 2015-192322
Sep. 15, 2016  (JP) ................. 2016-180998

(51) Int. Cl.
| | |
|---|---|
| *B60K 23/00* | (2006.01) |
| *B60K 23/08* | (2006.01) |
| *B60K 17/344* | (2006.01) |
| *B60K 17/08* | (2006.01) |
| *F16H 37/06* | (2006.01) |
| *B60K 17/34* | (2006.01) |
| *B60K 17/346* | (2006.01) |
| *F16H 25/20* | (2006.01) |

(52) U.S. Cl.
CPC .......... *B60K 23/0808* (2013.01); *B60K 17/08* (2013.01); *B60K 17/34* (2013.01); *B60K 17/344* (2013.01); *B60K 17/3467* (2013.01); *F16H 37/065* (2013.01); *B60Y 2400/412* (2013.01); *B60Y 2400/414* (2013.01); *B60Y 2400/82* (2013.01); *F16H 25/20* (2013.01); *F16H 2025/209* (2013.01)

(58) Field of Classification Search
CPC  B60K 23/0808; B60K 17/3467; B60K 17/34; B60K 17/08; B60K 17/344; F16H 37/065; F16H 25/20; F16H 2025/209; B60Y 2400/414; B60Y 2400/82; B60Y 2400/412

See application file for complete search history.

(56) References Cited

U.S. PATENT DOCUMENTS 6,263,995 B1 * 7/2001 Watson ............... B60K 17/342
                                                    180/248
6,779,641 B2   8/2004 Vonnegut et al.
(Continued)

FOREIGN PATENT DOCUMENTS

JP      2016-074342 A    5/2016

*Primary Examiner* — Victor MacArthur
(74) *Attorney, Agent, or Firm* — Oliff PLC

(57) ABSTRACT

A transfer includes an input shaft, an output shaft, an output member, a high-low switching mechanism, a clutch, an actuator, a screw mechanism, a first transmitting mechanism, a cam engaging member, a drum cam, and a second transmitting mechanism. The high-low switching mechanism is configured to change a rate of rotation of the input shaft and transmit a resultant rotation to the output shaft. The second transmitting mechanism is configured to transmit a movement of one of the drum cam and the cam engaging member that is connected to a second shaft to the high-low switching mechanism via the second shaft such that the high-low switching mechanism switches between the high-speed gear and the low-speed gear.

12 Claims, 18 Drawing Sheets

(56) References Cited

U.S. PATENT DOCUMENTS

| | | | | |
|---|---|---|---|---|
| 6,851,537 B2* | 2/2005 | Bowen | ............... | F16D 28/00 |
| | | | | 180/249 |
| 2007/0251345 A1 | 11/2007 | Kriebernegg et al. | | |
| 2014/0343807 A1* | 11/2014 | Maki | ............ | F16H 61/68 |
| | | | | 701/51 |
| 2016/0096429 A1 | 4/2016 | Imafuku et al. | | |

* cited by examiner

TRANSFER

INCORPORATION BY REFERENCE

The disclosure of Japanese Patent Application No. 2015-192322 filed on Sep. 29, 2015 including the specification, drawings and abstract is incorporated herein by reference in its entirety.

BACKGROUND

1. Technical Field

The present disclosure relates to technology that reduces the size of a transfer compared to related art, in a transfer that includes a high-low switching mechanism that changes the rate of rotation input from an input shaft and outputs the resultant rotation to an output shaft, and a clutch that selectively transmits or interrupts the transmission of some of the power from the output shaft to an output member, or a clutch that adjusts transfer torque from the output shaft to the output member.

2. Description of Related Art

For example, one known transfer includes an input shaft, an output shaft, a high-low switching mechanism that changes the rate of rotation input from the input shaft and outputs the resultant rotation to the output shaft, an output member that is a different power output destination than the output shaft, and a clutch that selectively transmits or interrupts the transmission of some of the power from the output shaft to the output member, or a clutch that adjusts transfer torque from the output shaft to the output member. The transfer described in US 2007/0251345 A is one such transfer. With the transfer for a four-wheel drive vehicle described in US 2007/0251345 A, the switching operation of the high-low switching mechanism and the adjustment of the transfer torque of the clutch are performed by a single motor (actuator). In the transfer described in US 2007/0251345 A, as a converting mechanism that converts the rotation of the motor into linear motion, a drum cam is employed for the switching operation of the high-low switching mechanism, and a ball cam and a lever are employed for adjusting the transfer torque of the clutch.

SUMMARY

In a transfer such as that described in US 2007/0251345 A, the drum cam and the lever are operated by rotating a second shaft which is driven by a motor and is arranged parallel to the output shaft, and the length of the lever provided between the output shaft and the second shaft must be equal to or greater than a predetermined value in order to obtain a predetermined transfer torque in the clutch. Therefore, the distance between the output shaft and the second shaft is relatively long, and as a result, the transfer ends up being larger.

The present disclosure provides a transfer in which the distance between the output shaft and the second shaft is able to be reduced, which in turn enables the size of the transfer to be reduced.

One aspect of the present disclosure relates to a transfer includes an input shaft, an output shaft, an output member, a high-low switching mechanism, a clutch, an actuator, a screw mechanism, a first transmitting mechanism, a cam engaging member, a drum cam, and a second transmitting mechanism. The output member is configured to output power to a different output destination than the output shaft. The high-low switching mechanism is configured to change a rate of rotation of the input shaft and transmit a resultant rotation to the output shaft. The high-low switching mechanism includes a high-speed gear and a low-speed gear. The clutch is configured to transmit or interrupt a transmission of some of the power of the output shaft from the output shaft to the output member, or adjust transfer torque that is transmitted from the output shaft to the output member. The screw mechanism includes a threaded shaft member and a nut member. The threaded shaft member and the nut member are a pair of screw members. The threaded shaft member and the nut member are screwing together. The screw mechanism is configured to rotatably drive one of the screw members, of the threaded shaft member and the nut member, around an axis of the output shaft with the actuator such that the nut member moves in a direction of an axis of the output shaft. The first transmitting mechanism is configured to transmit a movement of the nut member that is in the direction of the axis of the output shaft to the clutch. The second transmitting mechanism includes a second shaft. The second shaft is arranged parallel to the output shaft. The second shaft is configured to move in a direction of an axis of the second shaft. The cam engaging member is connected to one of the second shaft and the one screw member. The drum cam is connected to the other of the second shaft and the one screw member. The drum cam includes a cam groove that engages with the cam engaging member. The drum cam is configured to move relative to the cam engaging member in the direction of the axis of the second shaft, by rotation of the one screw member around the axis of the output shaft. The second transmitting mechanism is configured to transmit a movement, which is in the direction of the axis of the second shaft, of one of the drum cam and the cam engaging member that is connected to the second shaft to the high-low switching mechanism via the second shaft such that the high-low switching mechanism switches between the high-speed gear and the low-speed gear.

With the transfer according to this aspect, when the one screw member is rotatably driven by the actuator around the output shaft, the nut member moves in the direction of the axis of the output shaft and the linear motion of the nut member is transmitted to the clutch via the first transmitting mechanism. Also, when the one screw member is rotatably driven by the actuator around the output shaft, the drum cam moves relative to the cam engaging member in the direction of the axis of the second shaft, and the movement of the second shaft along with cam engaging member or the drum cam is transmitted to the high-low switching mechanism via the second transmitting mechanism. As a result, the linear motion of the nut member of the screw mechanism that is provided on the output shaft is transmitted to the clutch via the first transmitting mechanism, so there is no longer a need to provide a ball cam and a lever for adjusting the transfer torque of the clutch, for example, as there is in the related art. Consequently, the distance between the output shaft and the second shaft is able to be suitably shortened, which enables the transfer to be smaller in size.

In the transfer according to the aspect described above, the cam groove of the drum cam may include an inclined cam groove portion and a switching cam groove portion. The inclined cam groove portion may extend in a direction inclined with respect to the axis of the second shaft or the axis of the output shaft. The switching cam groove portion may extend in a direction perpendicular to the axis of the second shaft or the axis of the output shaft. The switching cam groove portion may be adapted to adjust the transfer torque that is transmitted from the output shaft to the output member. The switching cam groove portion may be configured to prevent the relative movement of the cam engaging member and the drum cam in the direction of the axis of the second shaft regardless of rotation of the one screw member around the axis of the output shaft.

With the transfer according to this aspect, when the one screw member is rotated around the axis of the output shaft, while the cam engaging member is engaged with the inclined cam groove portion of the cam groove formed on the drum cam, the drum cam moves relative to the cam engaging member in the direction of the axis of the second shaft, and the high-low switching mechanism switches to the low-speed gear, for example. Moreover, when the cam engaging member engages with the switching cam groove portion when the high-low switching mechanism has been switched the low-speed gear, relative rotation of the cam engaging member and the drum cam in the direction of the axis of the second shaft is prevented regardless of rotation of the one screw member around the output shaft. Therefore, the nut member moves in the direction of the axis of the output shaft while the high-low switching mechanism remains in the low-speed gear or the high-speed gear to which it was switched, and the linear motion of the nut member is transmitted to the clutch via the first transmitting mechanism. As a result, transfer torque transmitted to the output member is able to be adjusted by the clutch, while the high-low switching mechanism is in a state in which it has been switched to the low-speed gear or high-speed gear.

In the transfer according to the aspect described above, the switching cam groove portion may include a first switching cam groove portion and second switching cam groove portion. The first switching cam groove portion may be provided on one end portion of the inclined cam groove portion. The second switching cam groove portion may be provided on the other end portion of the inclined cam groove portion.

With the transfer according to this aspect, when the cam engaging member engages with the first switching cam groove portion or the second switching cam groove portion as a result of the one screw member being rotated around the axis of the output shaft, the high-low switching mechanism is able to be switched to the high-speed gear or the low-speed gear. Moreover, even if the one screw member rotates around the axis of the output shaft while the cam engaging member is engaged with the first switching cam groove portion or the second switching cam groove portion, relative movement of the cam engaging member and the drum cam in the direction of the axis of the second shaft is prevented regardless of the rotation of the one screw member around the axis of the output shaft. As a result, transfer torque transmitted to the output member can be adjusted by the clutch while the high-low switching mechanism is in the high-speed gear or the low-speed gear.

In the transfer according to the aspect described above, the cam groove formed on the drum cam may include an inclined cam groove portion that extends in a direction inclined with respect to the axis of the output shaft or the axis of the second shaft. The drum cam may be configured to move relative to the cam engagement member in the direction of the axis of the second shaft by the inclined cam groove portion, when the one screw member is rotated around the axis of the output shaft by the actuator, such that the drum cam moves in the direction of the axis of the second shaft by an amount of movement that is greater than an amount of movement of the nut member in the direction of the axis of the output shaft.

With the transfer according to this aspect, the responsiveness of the switch between the high-speed gear and the low-speed gear in the high-low switching mechanism is significantly improved compared to when the switch between the high-speed gear and the low-speed gear is achieved by the nut member of the screw mechanism moving in the direction of the axis of the output shaft, for example.

In the transfer according to the aspect described above, the cam engaging member may be connected to the second shaft. The drum cam may be connected to the one screw member.

With the transfer according to this aspect, the drum cam is connected to the one screw member of the screw mechanism provided on the output shaft in order to perform the switching operation of the high-low switching mechanism. Therefore, there is no longer a need to provide the drum cam on the second shaft as in the related art, so there is no longer a need to prevent the drum cam provided on the second shaft from interfering with the clutch and the high-low switching mechanism provided on the output shaft, as there is in the transfer according to the related art in which the drum cam is provided on the second shaft. Consequently, the distance between the output shaft and the fork shaft is able to be suitably shortened.

In the transfer according to the aspect described above, the drum cam may be connected to the nut member. The nut member may be supported in a manner able to rotate around the axis of the output shaft. The threaded shaft member may be supported in a manner unable to move in the direction of the axis of the output shaft and unable to rotate around the axis of the output shaft.

With the transfer according to this aspect, when the nut member is rotatably driven by the actuator, the nut member moves in the direction of the axis of the output shaft, and the linear motion of the nut member is transmitted to the clutch via the first transmitting mechanism. Moreover, when the nut member is rotatably driven by the actuator, the drum cam that is connected to the nut member rotates and the cam engaging member that is engaged with the cam groove moves in the direction of the axis of the second shaft, and the linear motion of the cam engaging member is transmitted to the high-low switching mechanism via the second transmitting mechanism.

In the transfer according to the aspect described above, the drum cam may be connected to the threaded shaft member. The nut member may be supported in a manner unable to rotate around the axis of the output shaft. The threaded shaft member may be supported in a manner unable to move in the direction of the axis of the output shaft and able to rotate around the axis of the output shaft.

With the transfer according to this aspect, when the threaded shaft member is rotatably driven by the actuator, the nut member moves in the direction of the axis of the output shaft, and the linear motion of the nut member is transmitted to the clutch via the first transmitting mechanism. Moreover, when the threaded shaft member is rotatably driven by the actuator, the drum cam that is connected to the threaded shaft member rotates and the cam engaging member that is engaged with the cam groove moves in the direction of the axis of the second shaft, and the linear motion of the cam engaging member is transmitted to the high-low switching mechanism via the second transmitting mechanism.

In the transfer according to the aspect described above, an output shaft support bearing that rotatably supports an end portion of the output shaft that is on the drum cam side, from among both end portions of the output shaft, may be arranged inside the drum cam within a length range of the drum cam in the direction of the axis of the output shaft.

With the transfer according to this aspect, the length of the dimension of the transfer in the direction of the axis of the output shaft is suitably shortened.

In the transfer according to the aspect described above, the actuator may be connected to the nut member of the screw mechanism via a worm gear. The cam engaging member may be connected to a worm wheel of the worm gear. The drum cam may be connected to the second shaft. The drum cam may have a partial cylindrical shape that follows an outer periphery of the worm wheel.

With the transfer according to this aspect, the drum cam and the worm wheel are able to be arranged adjacent to each other, so the distance between the output shaft and the second shaft is able to be suitably shortened.

In the transfer according to the aspect described above, the second transmitting mechanism may include a standby mechanism that transmits a movement of the cam engaging member or a movement of the drum cam, in the direction of the axis of the second shaft, to the second shaft via a spring member With the transfer according to this aspect, when the high-low switching mechanism switches between the high-speed gear and the low-speed gear, shock that accompanies the switch of the high-low switching mechanism is absorbed by the spring member.

In the transfer according to the aspect described above, the nut member may screw together with the threaded shaft member via a plurality of balls.

With the transfer according to this aspect, the relative rotation between the nut member and the threaded shaft member is smoother, so the power required of the actuator during operation is stably reduced.

In the transfer according to the aspect described above, the clutch may be one of a single disc clutch and a multiple disc clutch. The clutch may be configured to adjust the transfer torque to the output member.

With the transfer according to this aspect, continuously variable control of the transfer torque of the clutch is possible, which in turn makes driving force distribution control to the front wheels and the rear wheels that is even better suited to the driving conditions possible.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, example embodiments of the present disclosure will be described with reference to the accompanying drawings. The drawings described in the example embodiments below have been simplified or modified as appropriate, so the scale ratios and the shapes and the like of the portions are not always accurately depicted. First, a first example embodiment of the present disclosure will be described.

Figure 1:
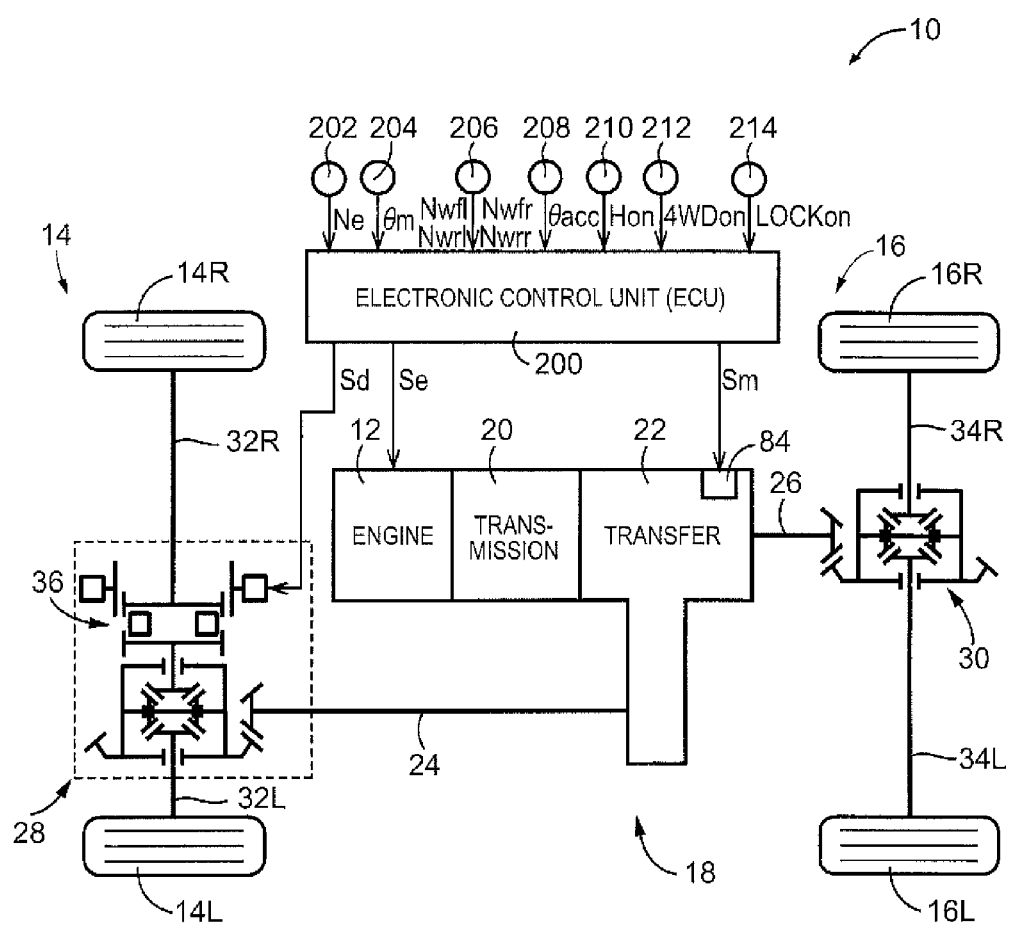
FIG. 1 is a view schematically showing the structure of a vehicle to which a first example embodiment of the present disclosure may be applied, and shows the main portions of a control system for various controls in the vehicle.

FIG. 1 is a view schematically showing the structure of a vehicle 10 to which the first example embodiment of the present disclosure may be applied, and illustrates the main portions of a control system for various controls in the vehicle 10. As shown in FIG. 1, the vehicle 10 includes an engine 12 as a driving force source, left and right front wheels 14L and 14R (simply referred to as "front wheels 14" unless otherwise specified), left and right rear wheels 16L and 16R (simply referred to as "rear wheels 16" unless otherwise specified), and a power transmitting apparatus 18 that transmits power from the engine 12 to the front wheels 14 and the rear wheels 16, and the like. The rear wheels 16 are main driving wheels that are driving wheels both when running in two-wheel drive (2WD) and in four-wheel drive (4WD). The front wheels 14 are auxiliary driving wheels that are driven wheels when running in 2WD and are driving wheels when running in 4WD. Therefore, the vehicle 10 is a front engine rear wheel drive (FR)-based four-wheel drive vehicle.

The power transmitting apparatus 18 includes a transmission 20, a transfer 22 for a four-wheel drive vehicle, a front propeller shaft 24, a rear propeller shaft 26, a front wheel differential gear unit 28, a rear wheel differential unit 30, left and right front wheel axles 32L and 32R (simply referred to as "front wheel axles 32" unless otherwise specified), and left and right rear wheel axles 34L and 34R (simply referred to as "rear wheel axles 34" unless otherwise specified), and the like. The transmission 20 is connected to the engine 12. The transfer 22 is a front-rear wheel power transfer that is connected to the transmission 20. The front propeller shaft 24 and the rear propeller shaft 26 are both connected to the transfer 22. The front wheel differential gear unit 28 is connected to the front propeller shaft 24. The rear wheel differential unit 30 is connected to the rear propeller shaft 26. The front wheel axles 32 are connected to the front wheel differential gear unit 28. The rear wheel axles 34 are connected to the rear wheel differential unit 30. In the power transmitting apparatus 18 structured in this way, power from the engine 12 that has been transmitted to the transfer 22 via the transmission 20 is then transmitted from the transfer 22 to the rear wheels 16 via a power transmitting path on the rear wheel side that includes the rear propeller shaft 26, the rear wheel differential unit 30, and the rear wheel axles 34 and the like in this order. Also, some of the power from the engine 12 that is to be transmitted to the rear wheel 16 side is distributed to the front wheel 14 side by the transfer 22, and then transmitted to the front wheels 14 via a power transmitting path on the front wheel side that includes the front propeller shaft 24, the front wheel differential gear unit 28, and the front wheel axles 32 and the like in this order.

The front wheel differential gear unit 28 includes a front-side clutch 36 on the front wheel axle 32R side (i.e., between the front wheel differential gear unit 28 and the front wheel 14R). The front-side clutch 36 is a mesh-type clutch that is electrically (electromagnetically) controlled and selectively connects or disconnects the power transmitting path between the front wheel differential gear unit 28 and the front wheel 14R. The front-side clutch 36 may also be provided with a synchronizing mechanism (a synchro mechanism).

Figure 2:
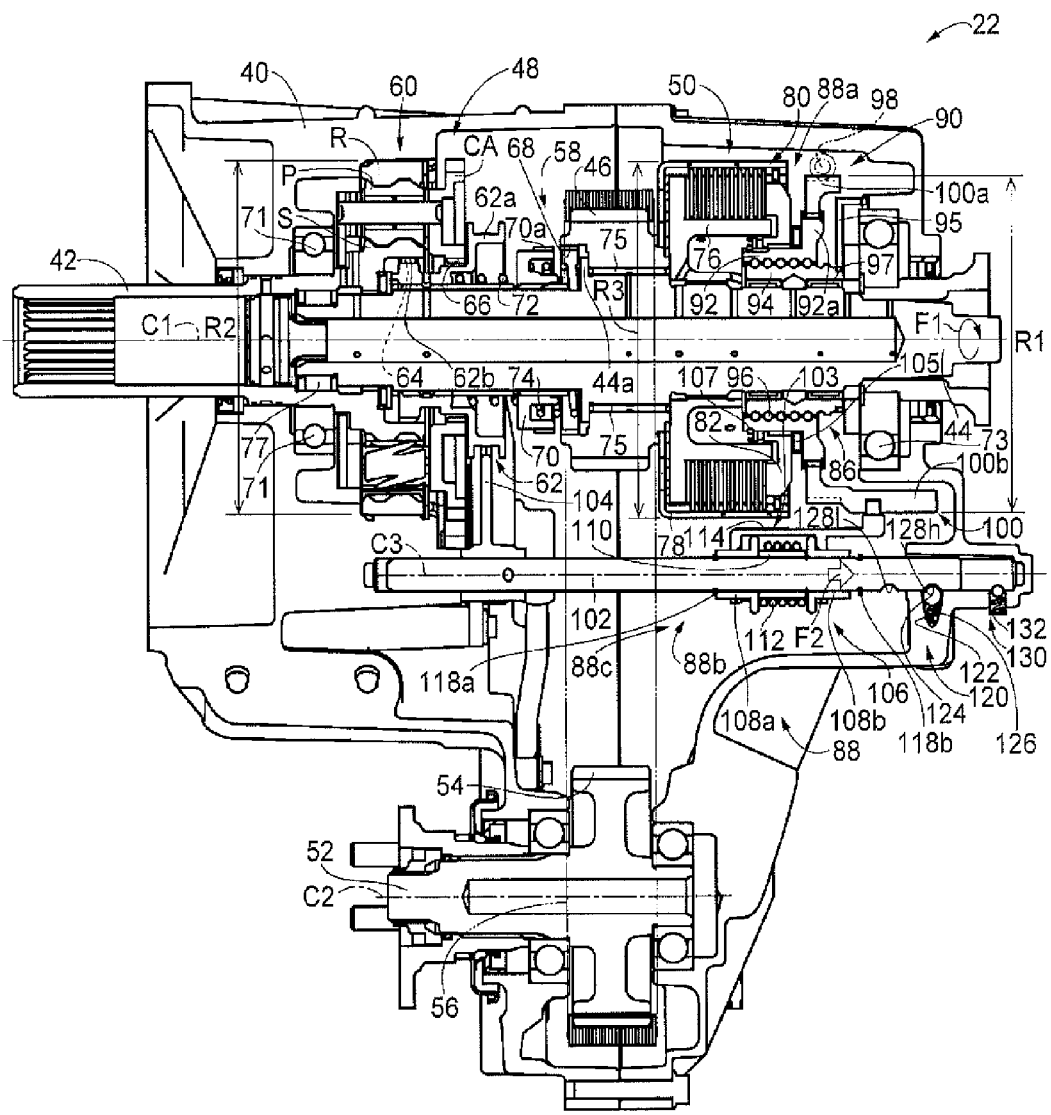
FIG. 2 is a sectional view schematically showing the structure of a transfer according to the first example embodiment of the present disclosure, and illustrates the manner for switching to a 4WD running state in a high-speed gear.
Figure 3:
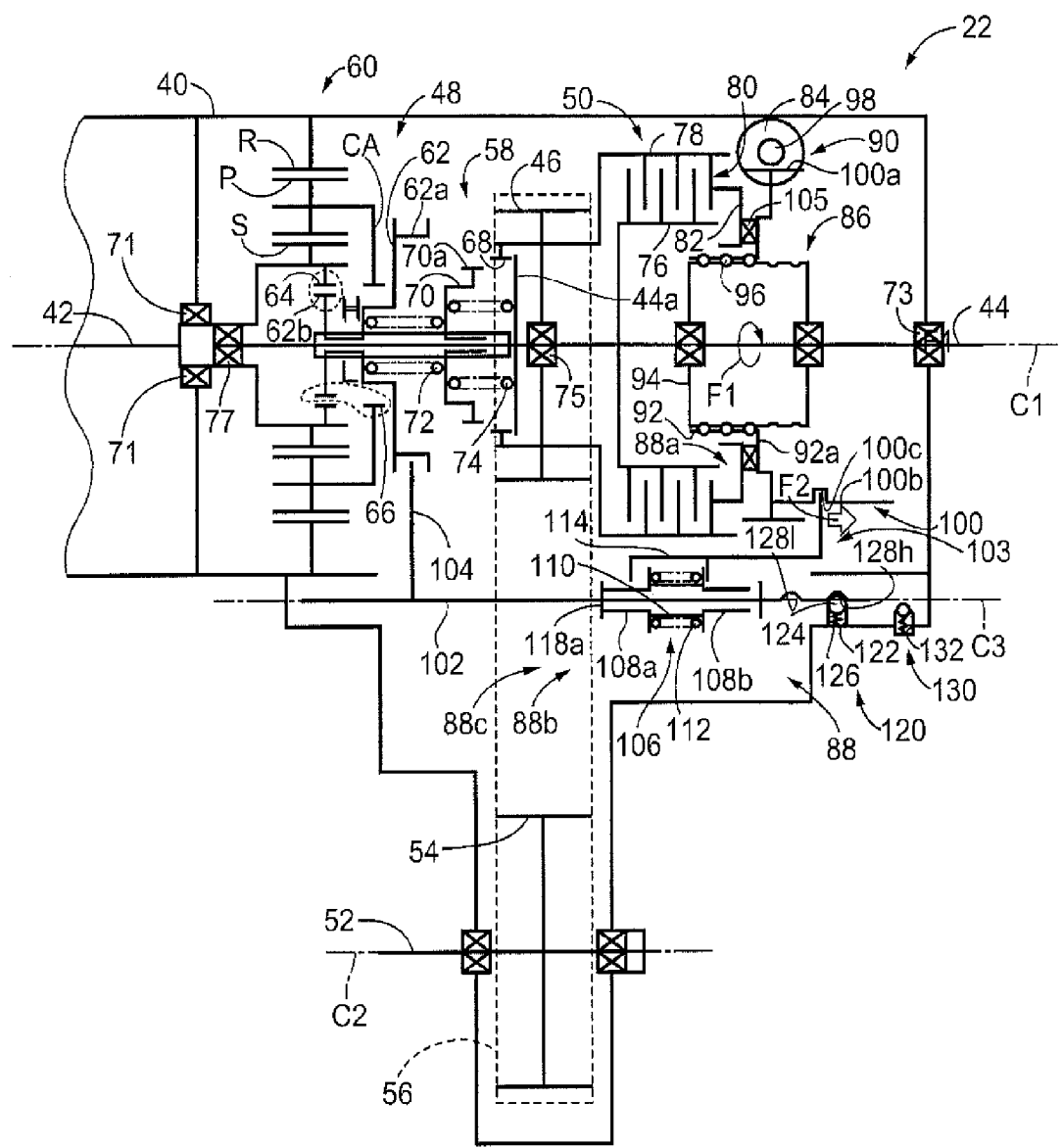
FIG. 3 is a skeleton view illustrating the general structure of the transfer.
Figure 4:
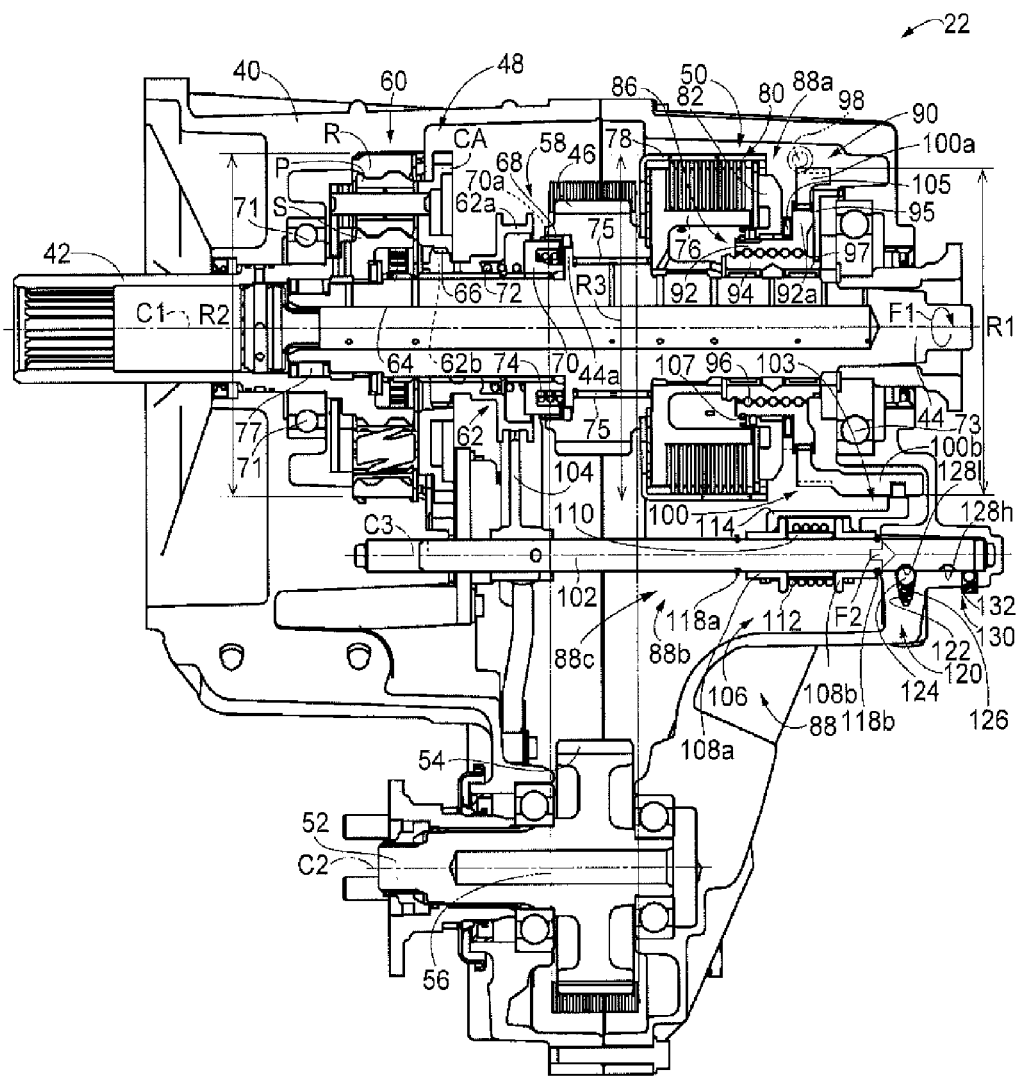
FIG. 4 is a sectional view schematically showing the structure of the transfer, and illustrates the manner for switching to the 4WD running state in a 4WD locked state in a low-speed gear.

FIGS. 2 to 4 are views schematically showing the structure of the transfer 22. FIGS. 2 and 4 are sectional views of the transfer 22, and FIG. 3 is a skeleton view of the transfer 22. As shown in FIGS. 2 to 4, the transfer 22 includes a transfer case 40 as a non-rotating member. The transfer 22 includes, all around a common first axis (axis) C1, an input shaft 42 that is rotatably supported by the transfer case 40, a rear-wheel side output shaft (output shaft) 44 that outputs power to the rear wheels 16 that serve as first left and right driving wheels, a sprocket-shaped drive gear (output member) 46 that outputs power to the front wheels 14 that serve as second left and right driving wheels, i.e., that has a different power output destination than the rear-wheel side output shaft 44, a high-low switching mechanism 48 as an auxiliary transmission that changes the rate of rotation input from the input shaft 42 and transmits the resultant rotation to the rear-wheel side output shaft 44, and a front-wheel drive clutch (clutch) 50 as a multiple disc friction clutch (multiple disc clutch) that adjusts the transfer torque transmitted from the rear-wheel side output shaft 44 to the drive gear 46, i.e., that transmits some of the power of the rear-wheel side output shaft 44 to the drive gear 46. The input shaft 42 and the rear-wheel side output shaft 44 are supported by the transfer case 40 via a pair of bearings, i.e., a first support bearing 71 and a second support bearing (output shaft support bearing) 73 so as to each be able to rotate around the same axis mutually. The drive gear 46 is supported by the rear-wheel side output shaft 44 via a third support bearing 75 in a manner concentric with, and rotatable relative to, the rear-wheel side output shaft 44. That is, the input shaft 42, the rear-wheel side output shaft 44, and the drive gear 46 are each supported by the transfer case 40 so as to be able to rotate around the first axis C1. A front-side end portion of the rear-wheel side output shaft 44 is rotatably supported by a bearing 77 that is arranged between a rear-side end portion of the input shaft 42 and the front-side end portion of the rear-wheel side output shaft 44, and a rear-side end portion of the rear-wheel side output shaft 44, i.e., the end portion on the drum cam 100 side, described later, from among both end portions of the rear-wheel side output shaft 44, is rotatably supported by the second support bearing 73.

As shown in FIGS. 2 to 4, the transfer 22 includes, inside the transfer case 40 and around a common second axis C2 that is parallel to the first axis C1, a front-wheel side output shaft 52, and a sprocket-shaped driven gear 54 integrally provided on the front-wheel side output shaft 52. Furthermore, the transfer 22 includes a front-wheel drive chain 56 that is wound around between the drive gear 46 and the driven gear 54, and a 4WD locking mechanism 58 as a dog clutch that integrally connects (i.e., locks) the rear-wheel side output shaft 44 and the drive gear 46 together.

The input shaft 42 is connected to an output shaft, not shown, of the transmission 20, via a coupling, and is rotatably driven by driving force (torque) input from the engine 12 via the transmission 20. The rear-wheel side output shaft 44 is a main drive shaft that is connected to the rear propeller shaft 26. The drive gear 46 is provided in a manner able to rotate relatively around the rear-wheel side output shaft 44. The front-wheel side output shaft 52 is an auxiliary drive shaft that is connected to the front propeller shaft 24 via a coupling, not shown.

The transfer 22 structured in this way adjusts the transfer torque transmitted to the drive gear 46 with the front-wheel drive clutch 50, and transmits the power transmitted from the transmission 20 to only the rear wheels 16, or distributes it to the front wheels 14 as well. Also, the transfer 22 switches between a 4WD locked state that prevents differential rotation between the rear propeller shaft 26 and the front propeller shaft 24, and a 4WD unlocked state that allows differential rotation between these, by the 4WD locking mechanism 58. Also, the transfer 22 establishes one of a high-speed gear (a high-speed speed) H and a low-speed gear (a low-speed speed) L, and changes the rate of rotation input from the transmission 20 and transmits the resultant rotation downstream. That is, the transfer 22 transmits the rotation of the input shaft 42 to the rear-wheel side output shaft 44 via the high-low switching mechanism 48. Also, when transfer torque through the front-wheel drive clutch 50 is zero and the 4WD locking mechanism 58 is released, power is not transmitted from the rear-wheel side output shaft 44 to the front-wheel side output shaft 52. On the other hand, when torque is transmitted through the front-wheel drive clutch 50 or the 4WD locking mechanism 58 is engaged, power is transmitted from the rear-wheel side output shaft 44 to the front-wheel side output shaft 52 via the drive gear 46, the front-wheel drive chain 56, and the driven gear 54.

More specifically, the high-low switching mechanism 48 includes a single pinion planetary gear set 60 and a high-low sleeve 62. The planetary gear set 60 includes a sun gear S that is connected to the input shaft 42 in a manner non-rotatable around the first axis C1 with respect to the input shaft 42, a ring gear R that is arranged substantially concentric with the sun gear S and is connected, in a manner non-rotatable around the first axis C1, to the transfer case 40, and a carrier CA that rotatably supports a plurality of pinion gears P that are in mesh with the sun gear S and the ring gear R, in a manner that enables the pinion gears P to revolve around the sun gear S. Therefore, the rotation speed of the sun gear S is the same as that of the input shaft 42, and the rotation speed of the carrier CA is slower than that of the input shaft 42. Also, high-side gear teeth 64 are fixed on an inner peripheral surface of this sun gear S, and low-side gear teeth 66 of the same diameter as the high-side gear teeth 64 are fixed on the carrier CA. The high-side gear teeth 64 are spline teeth that output rotation at the same speed as the input shaft 42 and are involved with establishing the high-speed gear H. The low-side gear teeth 66 are spline teeth that output rotation at a slower speed than the high-side gear teeth 64 and are involved with establishing the low-speed gear L. The high-low sleeve 62 is spline engaged with the rear-wheel side output shaft 44 in a manner able to move relative to the rear-wheel side output shaft 44 in a direction parallel to the first axis C1. The high-low sleeve 62 has a fork connecting portion 62a, and outer peripheral teeth 62b that are integrally provided adjacent to the fork connecting portion 62a and mesh with the high-side gear teeth 64 and the low-side gear teeth 66 by the high-low sleeve 62 moving in the direction parallel to the first axis C1 of the rear-wheel side output shaft 44. Rotation at the same speed as the rotation of the input shaft 42 is transmitted to the rear-wheel side output shaft 44 when the outer peripheral teeth 62b are in mesh with the high-side gear teeth 64, and rotation at a slower speed than the rotation of the input shaft 42 is transmitted to the rear-wheel side output shaft 44 when the outer peripheral teeth 62b are in mesh with the low-side gear teeth 66. The high-side gear teeth 64 and the high-low sleeve 62 function as a high-speed gear clutch for establishing the high-speed gear H, and the low-side gear teeth 66 and the high-low sleeve 62 function as a low-speed gear clutch for establishing the low-speed gear L.

The 4WD locking mechanism 58 has locking teeth 68 fixed on an inner peripheral surface of the drive gear 46, and a locking sleeve 70 that is spline engaged with the rear-wheel side output shaft 44 so as to be able to move in the direction of the first axis C1 with respect to the rear-wheel side output shaft 44 but unable to rotate relative to the rear-wheel side output shaft 44, and that has, fixed to an outer peripheral surface thereof, outer peripheral teeth 70a that mesh with the locking teeth 68 formed on the drive gear 46 when the locking sleeve 70 moves in the direction of the first axis C1. In the transfer 22, when the 4WD locking mechanism 58 is in an engaged state in which the outer peripheral teeth 70a of the locking sleeve 70 are in mesh with the locking teeth 68, the rear-wheel side output shaft 44 and the drive gear 46 rotate together as a unit, such that 4WD locked state is established.

The high-low sleeve 62 is provided in a space on the drive gear 46 side of the first support bearing 71 provided on the input shaft 42 (more specifically, in a space on the drive gear 46 side of the planetary gear set 60). The locking sleeve 70 is provided separate from and adjacent to the high-low sleeve 62, in the space between the high-low switching mechanism 48 and the drive gear 46. The transfer 22 is provided with a preloaded first spring 72 between the high-low sleeve 62 and the locking sleeve 70. This first spring 72 is abutted against the high-low sleeve 62 and locking sleeve 70, and urges the high-low sleeve 62 and the locking sleeve 70 away from each other. The transfer 22 is also provided with a preloaded second spring 74 between the drive gear 46 and the locking sleeve 70. This second spring 74 is abutted against a protruding portion 44a of the rear-wheel side output shaft 44 and the locking sleeve 70, and urges the locking sleeve 70 toward the side away from the locking teeth 68. The urging force of the first spring 72 is set larger than the urging force of the second spring 74. The protruding portion 44a is a flange portion of the rear-wheel side output shaft 44 that is provided protruding on the locking teeth 68 side in a space on the radially inner side of the drive gear 46. The high-side gear teeth 64 are provided in a position farther away from the locking sleeve 70 than the low-side gear teeth 66 when viewed in a direction parallel to the first axis C1. The outer peripheral teeth 62b of the high-low sleeve 62 mesh with the high-side gear teeth 64 on the side where the high-low sleeve 62 moves away from the locking sleeve 70 (i.e., on the left side in FIGS. 2 and 3), and mesh with the low-side gear teeth 66 on the side where the high-low sleeve 62 moves toward the locking sleeve 70 (i.e., on the right side in FIGS. 2 and 3). The outer peripheral teeth 70a of the locking sleeve 70 mesh with the locking teeth 68 on the side where the locking sleeve 70 moves toward the drive gear 46 (i.e., on the right side in FIGS. 2 and 3). Therefore, the outer peripheral teeth 70a of the locking sleeve 70 mesh with the locking teeth 68 when the high-low sleeve 62 is in the position in which the outer peripheral teeth 62b of the high-low sleeve 62 are in mesh with the low-side gear teeth 66.

The front-wheel drive clutch 50 is a multiple disc friction clutch that includes a clutch hub 76 that is connected to the rear-wheel side output shaft 44 in a manner unable to rotate relative to the rear-wheel side output shaft 44, a clutch drum 78 that is connected to the drive gear 46 in a manner unable to rotate relative to the drive gear 46, a friction engagement element 80 that is interposed between the clutch hub 76 and the clutch drum 78 and selectively engages and disengages the clutch hub 76 and the clutch drum 78, and a piston 82 that presses on the friction engagement element 80. The front-wheel drive clutch 50 is arranged around the first axis C1 of the rear-wheel side output shaft 44, on the opposite side of the drive gear 46 than the high-low switching mechanism 48 in the direction of the first axis C1 of the rear-wheel side output shaft 44. The friction engagement element 80 is pressed on by the piston 82 that moves toward the drive gear 46 side. The front-wheel drive clutch 50 is placed in a released state when the piston 82 is moved toward the non-pressing side (i.e., the right side in FIGS. 2 and 3) that is the side away from the drive gear 46 in a direction parallel to the first axis C1, and is not abutting against the friction engagement element 80. On the other hand, the front-wheel drive clutch 50 is placed in a slip state or a completely engaged state by the transfer torque (torque capacity) being adjusted by the amount of movement of the piston 82, when the piston 82 is moved toward the pressing side (i.e., the left side in FIGS. 2 and 3) that is the side closer to the drive gear 46 in a direction parallel to the first axis C1, and is abutting against the friction engagement element 80.

When the front-wheel drive clutch 50 is in the released state and the 4WD locking mechanism 58 is in a released state in which the outer peripheral teeth 70a of the locking sleeve 70 are not in mesh with the locking teeth 68, the power transmitting path between the rear-wheel side output shaft 44 and the drive gear 46 is interrupted such that the transfer 22 transmits the power transmitted from the transmission 20 to only the rear wheels 16. When the front-wheel drive clutch 50 is in the slip state or the completely engaged state, the transfer 22 distributes the power transmitted from the transmission 20 to both the front wheels 14 and the rear wheels 16. When the front-wheel drive clutch 50 is in the slip state, differential rotation is allowed between the rear-wheel side output shaft 44 and the drive gear 46, such that a differential state (4WD unlocked state) is established in the transfer 22. When the front-wheel drive clutch 50 is in the completely engaged state, the rear-wheel side output shaft 44 and the drive gear 46 rotate together as a unit, such that the 4WD locked state is established in the transfer 22. The front-wheel drive clutch 50 is able to continuously change the torque distribution between the front wheels 14 and the rear wheels 16 between 0:100 and 50:50, for example, by controlling the transfer torque.

The transfer 22 also includes, as an apparatus that operates the high-low switching mechanism 48, the front-wheel drive clutch 50, and the 4WD locking mechanism 58, an electric motor (actuator) 84 (see FIG. 3), a screw mechanism 86 that converts the rotational motion of the electric motor 84 into linear motion, and a transmitting mechanism 88 that transmits the linear motion of the screw mechanism 86 to the high-low switching mechanism 48, the front-wheel drive clutch 50, and the 4WD locking mechanism 58.

The screw mechanism 86 is arranged around the same first axis C1 as the rear-wheel side output shaft 44, on the opposite side of the front-wheel drive clutch 50 from the drive gear 46, and includes a nut member (one threaded member) 92 as a rotating member that is indirectly connected to the electric motor 84 via a worm gear 90 provided in the transfer 22, a threaded shaft member (another threaded member) 94 that screws together with the nut member 92, and a connecting member 95 that connects a rear-side end portion of threaded shaft member 94 to the transfer case 40 that is a non-rotating member, in order to arrange the threaded shaft member 94 on the rear-wheel side output shaft 44 in a manner unable to move in the direction of the first axis C1 of the rear-wheel side output shaft 44 and unable to rotate around the first axis C1. The nut member 92 screws together with the threaded shaft member 94 via a plurality of balls 96, and the screw mechanism 86 is a ball screw in which the nut member 92 and the threaded shaft member 94 operate via the plurality of balls 96. Also, the threaded shaft member 94 is relatively rotatably supported by the rear-wheel side output shaft 44 via a needle bearing 97. With the screw mechanism 86 structured in this way, the nut member 92, which is one of the screw members, of the threaded shaft member 94 and the nut member 92 that are supported by the rear-wheel side output shaft 44 and screw together, moves in the direction of the first axis C1 of the rear-wheel side output shaft 44 by being rotatably driven by the electric motor 84 around the first axis C1 of the rear-wheel side output shaft 44. Of the nut member 92 and the threaded shaft member 94 that are supported by the rear-wheel side output shaft 44, the nut member 92 is rotatably supported around the first axis C1 of the rear-wheel side output shaft 44 by the rear-wheel side output shaft 44, by being screwed together with the threaded shaft member 94, and the threaded shaft member 94 is supported by the rear-wheel side output shaft 44 in a manner unable to move in the direction of the first axis C1 of the rear-wheel side output shaft 44 and unable to rotate around the first axis C1 of the rear-wheel side output shaft 44, by the connecting member 95. Also, in this example embodiment, when the nut member 92 is rotated in the direction of arrow F1 around the first axis C1 by the electric motor 84 as shown in FIGS. 2 and 5, the nut member 92 moves in a direction away from the front-wheel drive clutch 50, i.e., in the direction of arrow F2, in direction of the first axis C1, by the screwing action with the threaded shaft member 94.

The worm gear 90 is a gear pair that includes a worm 98 integrally formed on a motor shaft of the electric motor 84, and a worm wheel 100a that is formed on the drum cam 100 fixed to a flange portion 92a formed on a rear-side end portion of the nut member 92. For example, rotation of the electric motor 84 that is a brushless motor is reduced in speed and transmitted to the nut member 92 via the worm gear 90. The screw mechanism 86 converts the rotation of the electric motor 84 transmitted to the nut member 92 into linear motion of the nut member 92. Also, the worm wheel 100a formed on the drum cam 100 that is connected to, i.e., fixed to, the nut member 92 moves in the direction of the first axis C1 of the rear-wheel side output shaft 44 by the electric motor 84 being rotatably driven. However, even when the worm wheel 100a moves, the width dimension in the direction of the first axis C1 of the worm wheel 100a is larger than the width dimension in the direction of the first axis C1 of the worm 98 that is formed on the motor shaft of the electric motor 84 that is fixed to the transfer case 40, and the outer peripheral teeth of the worm wheel 100a are formed as spur teeth, such that the worm wheel 100a is in constant mesh with the worm 98 formed on the motor shaft.

The transmitting mechanism 88 includes a first transmitting mechanism (a first transmitting mechanism) 88a that transmits the linear motion of the nut member 92 of the screw mechanism 86 to the front-wheel drive clutch 50, and a second transmitting mechanism (a second transmitting mechanism) 88b that transmits movement in the direction of a third axis (axis) C3 of a fork shaft (a second shaft) 102 that is connected to a cam engaging member 103, described later, that is engaged with a cam groove 100c formed on the drum cam 100, to the high-low switching mechanism 48. As shown in FIGS. 2 to 4, the cam engaging member 103 is connected to the fork shaft 102, and the drum cam 100 is connected to the nut member 92.

Figure 5:
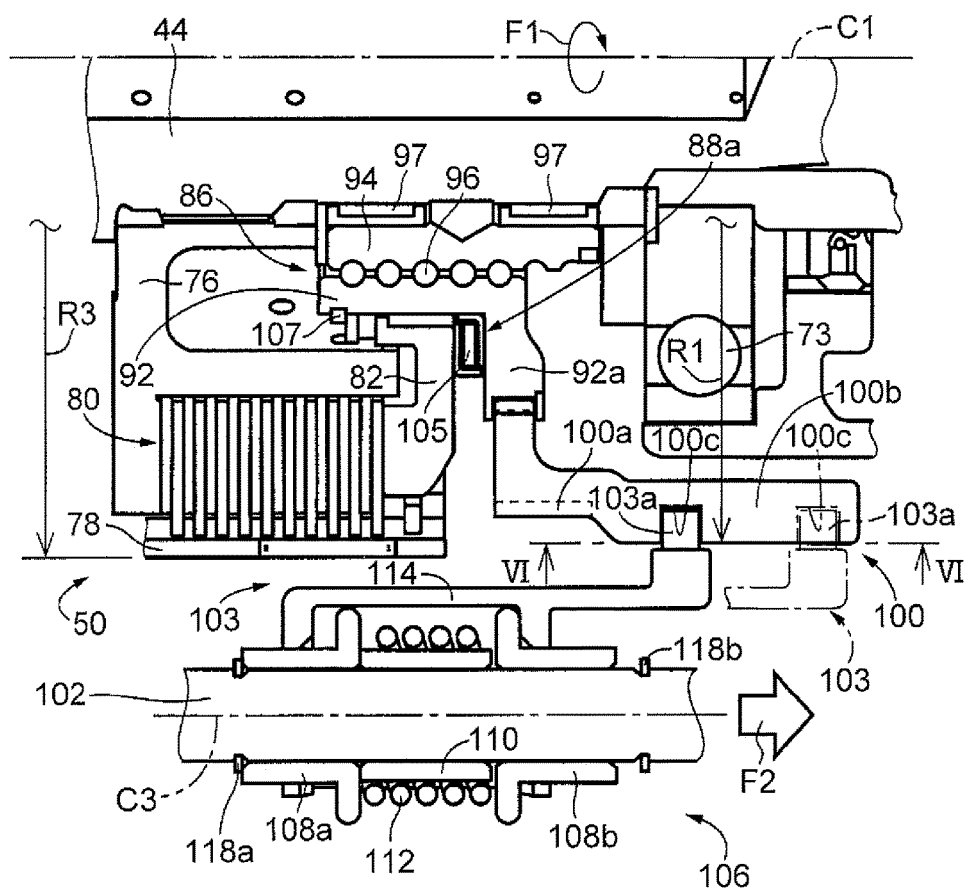
FIG. 5 is an enlarged view of FIG. 2, illustrating a drum cam provided in the transfer.

As shown in FIGS. 2 and 5, the drum cam 100 includes the annular worm wheel 100a that is in mesh with the worm 98 formed on the motor shaft of the electric motor 84, a protrusion 100b that protrudes in a direction toward the rear propeller shaft 26 from the worm wheel 100a, on the end portion on the fork shaft 102 side of the worm wheel 100a, and the cam groove 100c formed on the outer periphery of this protrusion 100b. The protrusion 100b has a shape in which a portion of the worm wheel 100a in the circumferential direction is a cylindrical portion, for example, that protrudes out in a direction toward the rear propeller shaft 26. The second support bearing 73 that rotatably supports the end portion of the rear-wheel side output shaft 44 that is on the drum cam 100 side, from among both end portions of the rear-wheel side output shaft 44, is arranged inside of the drum cam 100 within the length range of the drum cam 100 in the direction of the first axis C1 of the rear-wheel side output shaft 44. Also, the drum cam 100 is formed such that a dimension R1 of the drum cam 100 in the radial direction of the rear-wheel side output shaft 44 is equal to or less than a dimension R2 of the high-low switching mechanism 48 in the radial direction of the rear-wheel side output shaft 44 and a dimension R3 of the front-wheel drive clutch 50 in the radial direction of the rear-wheel side output shaft 44. The dimension R2 is an outer diameter dimension of the ring gear R or the carrier CA of the high-low switching mechanism 48. The dimension R3 is an outer dimension of the clutch drum 78 of the front-wheel drive clutch 50.

Figure 6A:
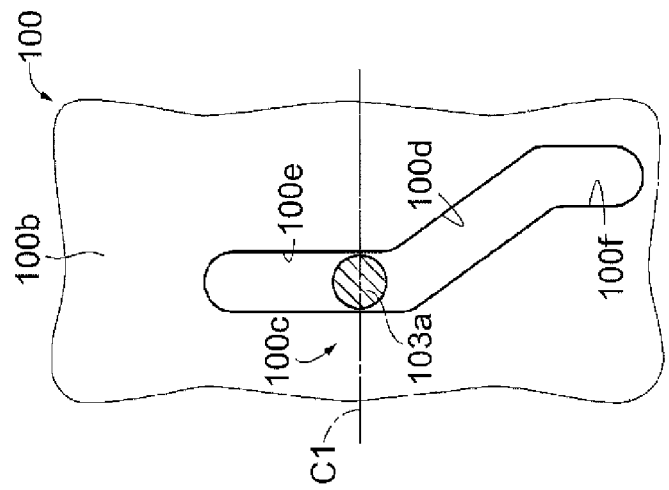
FIG. 6A is a sectional view taken along line VI-VI in FIG. 5, and shows the position of a cam engaging member that is connected to a fork shaft when the fork shaft is in a high gear position.
Figure 6B:
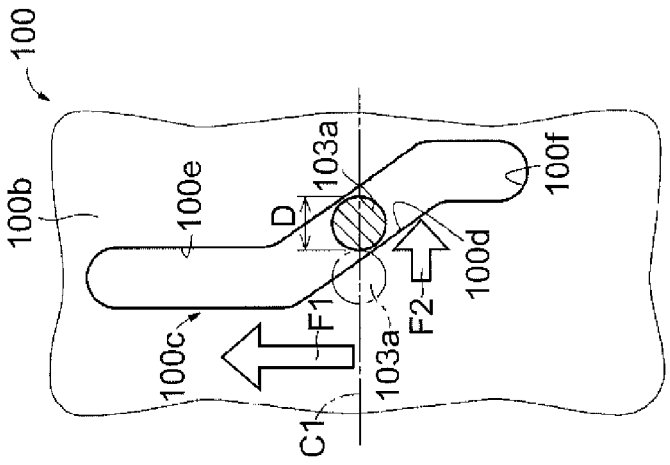
FIG. 6B is a sectional view taken along line VI-VI in FIG. 5, and shows the position of the cam engaging member that is connected to the fork shaft when the fork shaft is in the middle of switching from the high gear position to a low gear position.
Figure 6C:
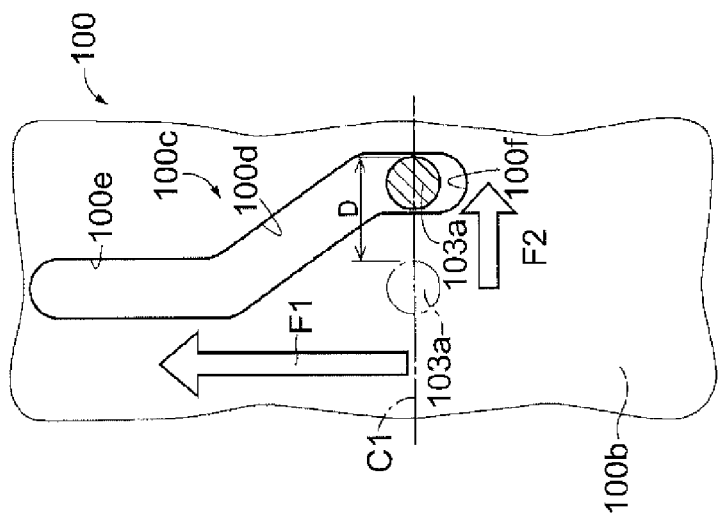
FIG. 6C is a sectional view taken along line VI-VI in FIG. 5, and shows the position of the cam engaging member that is connected to the fork shaft when the fork shaft is in the low gear position.

As shown in FIG. 6A to 6C, the cam groove 100e formed on an output periphery of the drum cam 100 includes an inclined cam groove portion 100d that extends in a direction inclined with respect to the first axis C1 of the rear-wheel side output shaft 44, a first cam groove portion 100e, as the switching cam groove portion, that is formed on an end portion on the screw mechanism 86 side of the inclined cam groove portion 100d, and extends in a direction orthogonal/perpendicular to the first axis C1, and a second cam groove portion 100f that is formed on an end portion of the inclined cam groove portion 100d that is on the opposite side from the screw mechanism 86 side, and extends in a direction perpendicular to the first axis C1. With the drum cam 100 structured in this way, as shown in FIG. 6A, for example, when the drum cam 100 is rotated in the direction of arrow F1 around the first axis C1 as the nut member 92 is rotated in the direction of arrow F1 around the first axis C1 by the electric motor 84, a tip end portion 103a of the cam engaging member 103 is moved along the inclined cam groove portion 100d of the drum cam 100 in the direction of arrow F2, i.e., in the direction of the third axis C3 of the fork shaft 102, by an amount of movement D that is greater than the amount of movement of the nut member 92 in the direction of arrow F2, i.e., the amount of movement of the nut member 92 in the direction of arrow F2 by the screwing action of the nut member 92 with the threaded shaft member 94, from a state in which the tip end portion 103a of the cam engaging member 103 is arranged inside the first cam groove portion 100e of the cam groove 100c of the drum cam 100. That is, when the nut member 92 is rotated in the direction of arrow F1 around the first axis C1 by the electric motor 84 from the state shown in FIG. 6A, the drum cam 100 is moved relative to the cam engaging member 103, due to the inclined cam groove portion 100d, in the direction of the third axis C3 of the fork shaft 102 by the amount of movement D that is greater than the amount that the nut member 92 moves in the direction of arrow F2 by the screwing action of the nut member 92 with the threaded shaft member 94. Also, as shown in FIG. 6C, for example, when the drum cam 100 is rotated in the direction opposite the direction of arrow F1 around the first axis C1 as the nut member 92 is rotated in the direction opposite the direction of arrow F1 around the first axis C1 by the electric motor 84, the tip end portion 103a of the cam engaging member 103 is moved along the inclined cam groove portion 100d of the drum cam 100 in the direction opposite the direction of arrow F2, by an amount of movement D that is greater than the amount of movement of the nut member 92 in the direction opposite the direction of arrow F2, i.e., the amount of movement of the nut member 92 in the direction opposite the direction of arrow F2 by the screwing action of the nut member 92 with the threaded shaft member 94, from a state in which the tip end portion 103a of the cam engaging member 103 is arranged inside the second cam groove portion 100f of the cam groove 100c of the drum cam 100. That is, when the electric motor 84 is rotatably driven such that the drum cam 100 is rotated around the first axis C1 of the rear-wheel side output shaft 44 via the nut member 92, the cam engaging member 103 that is engaged with the cam groove 100c formed on the drum cam 100 is moved by this cam groove 100c in the direction of the first axis C1 of the rear-wheel side output shaft 44, i.e., is moved in the direction of the third axis C3 of the fork shaft 102. That is, when the electric motor 84 is rotatably driven such that the drum cam 100 is rotated around the first axis C1 of the rear-wheel side output shaft 44 via the nut member 92, the drum cam 100 is moved relative to the cam engaging member 103 in the direction of the third axis C3 of the fork shaft 102. The alternate long and short dash line circle shown in FIGS. 6B and 6C indicates the position of the tip end portion 103a of the cam engaging member 103 in FIG. 6A. The first axis C1 of the rear-wheel side output shaft 44, the second axis C2 of the front-wheel side output shaft 52, and the third axis C3 of the fork shaft 102 are all parallel to one another. When the drum cam 100 is rotated in the direction opposite the direction of arrow F1 around the first axis C1 as the nut member 92 is rotated in the direction opposite the direction of arrow F1 around the first axis C1 by the electric motor 84, from the state shown in FIG. 6A, for example, the cam engaging member 103 is moved along the first cam groove portion 100e and is not moved in the direction of the first axis C1 of the rear-wheel-side output shaft 44, i.e., in the direction of the third axis C3 of the fork shaft 102. That is, while the cam engaging member 103 is engaged inside the first cam groove portion 100e, movement of the cam engaging member 103 in the direction of the third axis C3 of the fork shaft 102, i.e., relative movement of the cam engaging member 103 and the drum cam 100 in the direction of the third axis C3 of the fork shaft 102, is prevented by the first cam groove portion 100e, regardless of the rotation of the nut member 92 in the direction opposite the direction of arrow F1 around the first axis C1.

As shown in FIGS. 2 to 5, the first transmitting mechanism 88a includes a thrust bearing 105 interposed between the piston 82 and the flange portion 92a of the nut member 92, and a stopper member 107 that prevents relative movement of the piston 82 toward the friction engagement element 80 side with respect to the nut member 92. The piston 82 is connected to the nut member 92 in a manner unable to move relative to the nut member 92 in the direction of the first axis C1 and able to rotate relative to the nut member 92 around the first axis C1, by the thrust bearing 105 and the stopper member 107. As a result, the linear motion of the nut member 92 of the screw mechanism 86 is transmitted to the piston 82 of the front-wheel drive clutch 50 via the first transmitting mechanism 88a.

Also, as shown in FIGS. 2 to 5, the second transmitting mechanism 88b includes i) the fork shaft 102 that is arranged parallel to the first axis C1 of the rear-wheel side output shaft 44 inside the transfer case 40 and supported so as to be able to move in the direction of the third axis C3, ii) the fork 104 that is fixed to the fork shaft 102 and connected to the high-low sleeve 62, and iii) a standby mechanism 106 that transmits movement in the direction of the first axis C1 of the cam engaging member 103, i.e., in the direction of the third axis C3, to the fork shaft 102 via a spring member 112. The standby mechanism 106 is provided in the cam engaging member 103. Therefore, the second transmitting mechanism 88b transmits movement of the cam engaging member 103 in the direction of the first axis C1, i.e., the direction of the third axis C3, to the high-low sleeve 62 of the high-low switching mechanism 48 via the standby mechanism 106, the fork shaft 102, and the fork 104. As a result, when the cam engaging member 103 moves in the direction of arrow F2 from the state shown in FIGS. 2 and 6A, for example, the high-low sleeve 62 is moved toward the drive gear 46 side, i.e., the outer peripheral teeth 62b of the high-low sleeve 62 are moved to a position where they mesh with the low-side gear teeth 66. Also, when the cam engaging member 103 moves in the direction opposite the direction of the arrow F2 from the state shown in FIGS. 4 and 6C, for example, the high-low sleeve 62 is moved toward the side away from the drive gear 46, i.e., the outer peripheral teeth 62b of the high-low sleeve 62 are moved to a position where they mesh with the high-side gear teeth 64.

Also, the transmitting mechanism 88 includes a third transmitting mechanism 88c that transmits the linear motion of the nut member 92 of the screw mechanism 86 to the 4WD locking mechanism 58. The third transmitting mechanism 88c shares the fork shaft 102, the fork 104, and the standby mechanism 106 that are in the second transmitting mechanism 88b, with the second transmitting mechanism 88b. The third transmitting mechanism 88c also includes a high-low sleeve 62 that is connected to the fork 104, a first spring 72 that is arranged in a compressed state between the high-low sleeve 62 and the locking sleeve 70, and a second spring 74 that is arranged in a compressed state between the locking sleeve 70 and the protruding portion 44a of the rear-wheel side output shaft 44.

Therefore, with the third transmitting mechanism 88c, when the cam engaging member 103 is moved in the direction of arrow F2 and the outer peripheral teeth 62b of the high-low sleeve 62 are moved to the position where they mesh with the low-side gear teeth 66 in this way, the locking sleeve 70 receives thrust in the locking direction toward the drive gear 46 side via the first spring 72. As a result, the outer peripheral teeth 70a of the locking sleeve 70 are moved toward the drive gear 46 side against the urging force of the second spring 74 that is set weaker than the first spring 72, and come into mesh with the locking teeth 68 of the drive gear 46. Also, when the cam engaging member 103 is moved in the direction opposite the direction of the arrow F2 and the outer peripheral teeth 62b of the high-low sleeve 62 are moved to a position where they mesh with the high-side gear teeth 64, from the state in which the outer peripheral teeth 62b of the high-low sleeve 62 are in mesh with the low-side gear teeth 66, the locking sleeve 70 receives thrust in the 4WD unlocking direction toward the side away from the drive gear 46 from the second spring 74. As a result, the locking sleeve 70 is moved toward the side away from the drive gear 46 by the urging force of the second spring 74, such that the outer peripheral teeth 70a of the locking sleeve 70 separate from the locking teeth 68 of the drive gear 46.

The standby mechanism 106 includes two flanged cylindrical members 108a and 108b, a cylindrical spacer 110, a spring member 112, and a grasping member 114, as shown in FIG. 5. The two flanged cylindrical members 108a and 108b are arranged around the third axis C3 and are able to slide on the fork shaft 102 in a direction parallel to the third axis C3. The two flanged cylindrical members 108a and 108b are arranged such that a flange provided on one end portion of the flanged cylindrical member 108a faces a flange provided on one end portion of the flanged cylindrical member 108b. The spacer 110 is interposed between the two flanged cylindrical members 108a and 108b. The spring member 112 is arranged in a preloaded state on the outer peripheral side of the spacer 110. The grasping member 114 grasps the two flanged cylindrical members 108a and 108b in a manner that enables the two flanged cylindrical members 108a and 108b to slide in a direction parallel to the third axis C3. The grasping member 114 slides the flanged cylindrical members 108a and 108b on the fork shaft 102 by abutting against the flanges of the flanged cylindrical members 108a and 108b. The length between the flanges of the flanged cylindrical members 108a and 108b when the flanges are both abutted against the grasping member 114 is longer than the length of the spacer 110. Therefore, the state in which the flanges are both abutted against the grasping member 114 is created by the urging force of the spring member 112. Also, the standby mechanism 106 has stoppers 118a and 118b that stop the flanged cylindrical members 108a and 108b, respectively, from sliding apart in the direction parallel to the third axis C3, on the outer peripheral surface of the fork shaft 102. Stopping the flanged cylindrical members 108a and 108b from sliding apart with the stoppers 118a and 118b enables the second transmitting mechanism 88b to transmit the linear motion force of the nut member 92 to the high-low switching mechanism 48 via the fork shaft 102 and the fork 104.

The outer peripheral teeth 70a of the locking sleeve 70 mesh with the locking teeth 68 when the fork shaft 102 is in a position that places the outer peripheral teeth 62b of the high-low sleeve 62 in mesh with the low-side gear teeth 66 (hereinafter, this position will be referred to as a "low gear position"). The friction engagement element 80 of the front-wheel drive clutch 50 is pressed on by the piston 82 when the fork shaft 102 is in a position that places the outer peripheral teeth 62b of the high-low sleeve 62 in mesh with the high-side gear teeth 64 (hereinafter, this position will be referred to as a "high gear position"). The friction engagement element 80 of the front-wheel drive clutch 50 is not pressed on by the piston 82 when the fork shaft 102 is in the low gear position. Of FIGS. 6A to 6C, FIG. 6A is a view illustrating the position of the cam engaging member 103 when the fork shaft 102 is in the high gear position, FIG. 6C is a view illustrating the position of the cam engaging member 103 when the fork shaft 102 is in the low gear position, and FIG. 6B is a view illustrating the position of the cam engaging member 103 when the fork shaft 102 is in the middle of switching from the high gear position to the low gear position. Also, when the nut member 92, i.e., the drum cam 100, is rotated in the direction opposite the direction of arrow F1 by the electric motor 84, from the state shown in FIG. 6A, for example, the piston 82 of the front-wheel drive clutch 50 is moved from a position in which the piston 82 is not pressed against the friction engagement element 80 to a position in which the piston 82 is pressed against the friction engagement element 80, while the cam engaging member 103 does not move in the direction of the third axis C3 of the fork shaft 102 due to the first cam groove portion 100e, and the fork shaft 102 consequently remains in the high gear position.

When the fork shaft 102 is in the high gear position, the length between the flanges of the flanged cylindrical members 108a and 108b is able to be changed between the length when the flanges are both in a state abutted against the grasping member 114, and the length of the spacer 110. Therefore, the standby mechanism 106 allows the nut member 92 to move in the direction parallel to the first axis C1, between a position in which the friction engagement element 80 of the front-wheel drive clutch 50 is pressed on by the piston 82 and a position in which the friction engagement element 80 of the front-wheel drive clutch 50 is not pressed on by the piston 82, while the fork shaft 102 remains in the high gear position.

The transfer 22 includes a gear position maintaining mechanism 120 that maintains the high gear position of the fork shaft 102, and maintains the low gear position of the fork shaft 102. The gear position maintaining mechanism 120 (see FIG. 1) includes a housing hole 122, a locking ball 124, a locking spring 126, and recessed portions 128h and 128l. The housing hole 122 is formed in an inner peripheral surface of the transfer case 40 along which the fork shaft 102 slides. The locking ball 124 is housed in the housing hole 122. The locking spring 126 is housed in the housing hole 122 and urges the locking ball 124 toward the fork shaft 102 side. The recessed portions 128h and 128l are formed on an outer peripheral surface of the fork shaft 102. The recessed portion 128h receives a portion of the locking ball 124 when the fork shaft 102 is in the high gear position, and the recessed portion 128l receives a portion of the locking ball 124 when the fork shaft 102 is in the low gear position. With this gear position maintaining mechanism 120, the gear position (either the high or the low gear position) of the fork shaft 102 is able to be maintained even if output from the electric motor 84 is stopped in that gear position.

The transfer 22 includes a low gear position detection switch 130 that detects the low gear position of the fork shaft 102. The low gear position detection switch 130 is a ball-type contact switch, for example. The low gear position detection switch 130 is fixed in a through-hole 132 formed in the transfer case 40, in a position contacting the fork shaft 102 when the fork shaft 102 has moved to the low gear position. When the low gear position is detected by the low gear position detection switch 130, an indicator for notifying a driver that the 4WD locked state is established in the low-speed gear L is illuminated, for example.

Returning now to FIG. 1, the electronic control unit (ECU) 200 that includes a control apparatus of the vehicle 10 that switches between 2WD and 4WD, for example, is provided in the vehicle 10. The ECU 200 includes a so-called microcomputer that includes, for example, a CPU, RAM, ROM, and an input/output interface and the like. The CPU executes various controls of the vehicle 10 by processing signals according to a program stored in advance in the ROM, while using the temporary storage function of the RAM. For example, the ECU 200 executes output control of the engine 12, and switching control to switch the driving state of the vehicle 10, and the like, and is formed divided into sections for engine control and driving state control and the like as necessary. As shown in FIG. 1, various actual values based on detection signals from various sensors provided in the vehicle 10 are supplied to the ECU 200. Examples of such actual values include an engine speed Ne, a motor rotation angle θm, wheel speeds Nwfl, Nwfr, Nwrl, and Nwrr of the front wheels 14L and 14R and the rear wheels 16L and 16R, an accelerator operation amount θacc, an H-range request Hon that is a signal indicating that an H-range selector switch 210 has been operated, a 4WD request 4WDon that is a signal indicating that a 4WD selector switch 212 has been operated, and LOCKon that is a signal indicating that a 4WD lock selector switch 214 has been operated, and the like. Examples of the various sensors include an engine speed sensor 202, a motor rotation angle sensor 204, wheel speed sensors 206, an accelerator operation amount sensor 208, a H-range selector switch 210 for selecting the high-speed gear H in response to an operation by the driver, a 4WD selector switch 212 for selecting 4WD in response to an operation by the driver, and a 4WD lock selector switch 214 for selecting the 4WD locked state in response to an operation by the driver, and the like. Various signals, for example, an engine output control command signal Se for output control of the engine 12, an operation command signal Sd for switching the state of the front-side clutch 36, and a motor drive command signal Sm for controlling the rotation amount of the electric motor 84, and the like, are output from the ECU 200 to an output control apparatus of the engine 12, an actuator of the front-side clutch 36, the electric motor 84, and the transfer 22 and the like, respectively, as shown in FIG. 1.

In the vehicle 10 structured as described above, the amount of movement (i.e., the stroke) of the nut member 92 is controlled by controlling the rotation amount of the electric motor 84. When the fork shaft 102 is in the high gear position, the position in which the piston 82 is not abutted against the friction engagement element 80, i.e., the position in which the front-wheel drive clutch 50 is in a released state, is a position (hereinafter, referred to as an "H2 position") for placing the vehicle 10 in a 2WD running state in which only the rear wheels 16 are driven in the high-speed gear H. When the front-side clutch 36 is placed in the released state when the piston 82 is in this H2 position, rotation is not transmitted from either the engine 12 side or the front wheel 14 side, to the rotating elements (e.g., the drive gear 46, the front-wheel drive chain 56, the driven gear 54, the front-wheel side output shaft 52, the front propeller shaft 24, and the front wheel differential gear unit 28) that form the power transmitting path from the drive gear 46 to the front wheel differential gear unit 28, when running in 2WD. Therefore, when running in 2WD, these rotating elements are stopped from rotating and thus are prevented from being dragged along, so running resistance is reduced.

Also, as shown in FIG. 2, when the fork shaft 102 is in the high gear position, the position in which the piston 82 is abutted against the friction engagement element 80 as a result of driving the electric motor 84 a predetermined rotation amount to move the nut member 92 a predetermined stroke amount toward the pressing side from the position in which the piston 82 is not abutted against the friction engagement element 80, i.e., the position in which the front-wheel drive clutch 50 is in the slip state, is a position (hereinafter, referred to as an "H4 position") for placing the vehicle 10 in a 4WD running state in which power is transmitted to both the front wheels 14 and the rear wheels 16 in the high-speed gear H. When the piston 82 is in this H4 position, torque distribution between the front wheels 14 and the rear wheels 16 is adjusted as necessary by controlling the transfer torque of the front-wheel drive clutch 50 according to the pressure of the piston 82.

Also, when the fork shaft 102 is in the low gear position, the front-wheel drive clutch 50 is in the released state and the 4WD locking mechanism 58 is in the engaged state, as shown in FIG. 4, so this position is a position (referred to as an "L4 position") that places the vehicle 10 in the 4WD running state in the 4WD locked state in the low-speed gear L.

As described above, according to the transfer 22 of this example embodiment, when the nut member 92 is rotatably driven by the electric motor 84 around the first axis C1 of the rear-wheel side output shaft 44, the nut member 92 moves in the direction of the first axis C1 of the rear-wheel side output shaft 44 and the linear motion of the nut member 92 is transmitted to the front-wheel drive clutch 50 via the first transmitting mechanism 88*a*. Also, when the nut member 92 is rotatably driven by the electric motor 84 around the first axis C1 of the rear-wheel side output shaft 44, the drum cam 100 that is connected to the nut member 92 rotates and the cam engaging member 103 that is engaged with the cam groove 100*c* moves in the direction of the third axis C3 of the fork shaft 102, i.e., the drum cam 100 that is connected to the nut member 92 rotates, and the drum cam 100 moves relative to the cam engaging member 103 in the direction of the third axis C3 of the fork shaft 102, and the movement of the fork shaft 102 along with the cam engaging member 103 is transmitted to the high-low switching mechanism 48 via the second transmitting mechanism 88*b*. Therefore, the linear motion of the nut member 92 of the screw mechanism 86 that is provided on the rear-wheel side output shaft 44 is transmitted to the front-wheel drive clutch 50 via the first transmitting mechanism 88*a*, so there is no longer a need to provide a ball cam and a lever for adjusting the transfer torque of the front-wheel drive clutch 50, for example, as there is in the related art. Consequently, the distance between the rear-wheel side output shaft 44 and the fork shaft 102 is able to be suitably shortened, which enables the transfer 22 to be smaller in size.

Also, according to the transfer 22 of this example embodiment, the cam engaging member 103 is connected to the fork shaft 102, and the drum cam 100 is connected to the nut member 92. Therefore, in order to perform a switching operation of the high-low switching mechanism 48, the drum cam 100 is connected to the nut member 92 of the screw mechanism 86 provided on the rear-wheel side output shaft 44. As a result, there is no longer a need to provide the drum cam on the second shaft as in the related art, so there is no longer a need to prevent the drum cam provided on the second shaft from interfering with the clutch and the high-low switching mechanism provided on the output shaft, as there is in the transfer according to the related art in which the drum cam is provided on the second shaft. Consequently, the distance between the rear-wheel side output shaft 44 and the fork shaft 102 is able to be suitably shortened.

Also, according to the transfer 22 of this example embodiment, the nut member 92 is supported in a manner able to rotate around the first axis C1 of the rear-wheel side output shaft 44, and the threaded shaft member 94 is supported in a manner unable to move in the direction of the first axis C1 of the rear-wheel side output shaft 44 and unable to rotate around the first axis C1 of the rear-wheel side output shaft 44. In this way, when the nut member 92 is rotatably driven by the electric motor 84, the nut member 92 moves in the direction of the first axis C1 of the rear-wheel side output shaft 44 and the linear motion of the nut member 92 is transmitted to the front-wheel drive clutch 50 via the first transmitting mechanism 88*a*. Furthermore, when the nut member 92 is rotatably driven by the electric motor 84, the drum cam 100 that is connected to the nut member 92 rotates and the cam engaging member 103 that is engaged with the cam groove 100*c* moves in the direction of the third axis C3 of the fork shaft 102 and the linear motion of the cam engaging member 103 is transmitted to the high-low switching mechanism 48 via the second transmitting mechanism 88*b*.

Also, according to the transfer 22 of this example embodiment, the second support bearing 73 that rotatably supports the end portion of the rear-wheel side output shaft 44 that is on the drum cam 100 side, from among both end portions of the rear-wheel side output shaft 44, is arranged inside the drum cam 100 within the length range of the drum cam 100 in the direction of the first axis C1 of the rear-wheel side output shaft 44. Therefore, the length of the dimension of the transfer 22 in the direction of the first axis C1 of the rear-wheel side output shaft 44 is able to be suitably shorter.

Also, according to the transfer 22 of this example embodiment, the cam groove 100*c* formed on the drum cam 100 includes the inclined cam groove portion 100*d* that extends in a direction inclined with respect to the first axis C1 of the rear-wheel side output shaft 44, and when the drum cam 100 is rotated around the first axis C1 of the rear-wheel side output shaft 44 as the nut member 92 is rotated around the first axis C1 of the rear-wheel side output shaft 44 by the electric motor 84, the cam engaging member 103 is moved along the inclined cam groove portion 100*d* of the drum cam 100 in the direction of the third axis C3 of the fork shaft 102 by the amount of movement D that is greater than the amount of movement of the nut member 92 in the direction of the first axis C1 of the rear-wheel side output shaft 44. Therefore, the responsiveness when the high-low switching mechanism 48 switches between the high-speed gear H and the low-speed gear L is significantly improved compared to when the switch between the high-speed gear H and the low-speed gear L is achieved by the nut member 92 of the screw mechanism 86 moving in the direction of the first axis C1 of the rear-wheel side output shaft 44, for example.

Also, according to the transfer 22 of this example embodiment, the cam groove 100c formed on the drum cam 100 includes the first cam groove portion 100e that extends in a direction perpendicular to the first axis C1 of the rear-wheel-side output shaft 44. When the drum cam 100 is rotated in the direction opposite the direction of arrow F1 around the first axis C1 as the nut member 92 is rotated in the direction opposite the direction of arrow F1 around the first axis C1 by the electric motor 84, the cam engaging member 103 is moved along the first cam groove portion 100e and is not moved in the direction of the third axis C3 of the fork shaft 102. That is, by having the cam engaging member 103 be able to move along the first cam groove portion 100e due to the first cam groove portion 100e, the nut member 92 moves in the direction of the first axis C1 of the rear-wheel-side output shaft 44, and the linear motion of the nut member 92 is transmitted to the front-wheel drive clutch 50 via the first transmitting mechanism 88a. Therefore, transfer torque that is transmitted to the drive gear 46 can be adjusted by the front-wheel drive clutch 50 while the high-low switching mechanism 48 is in the high-speed gear H.

Also, according to the transfer 22 of this example embodiment, the nut member 92 is screwed together with the threaded shaft member 94 via the plurality of balls 96. Therefore, the relative rotation between the nut member 92 and the threaded shaft member 94 is smoother, so the power required of the electric motor 84 during operation is stably reduced.

Further, according to the transfer 22 of this example embodiment, the front-wheel drive clutch 50 is a clutch that adjusts the transfer torque to the drive gear 46, and the front-wheel drive clutch 50 is a multiple disc clutch. Therefore, continuously variable control of the transfer torque of the front-wheel drive clutch 50 is possible, which in turn makes driving force distribution control to the front wheels 14 and the rear wheels 16 that is even better suited to the driving conditions possible.

Moreover, with the transfer 22 of this example embodiment, the second transmitting mechanism 88b includes the standby mechanism 106 that transmits the movement of the cam engaging member 103 that is in the direction of the third axis C3 of the fork shaft 102, to the fork shaft 102 via the spring member 112. Therefore, when the high-low switching mechanism 48 switches between the high-speed gear H and the low-speed gear L, shock that accompanies the switch of the high-low switching mechanism 48 is absorbed by the spring member 112 of the standby mechanism 106.

Next, a second example embodiment of the present disclosure will be described. Portions common to the first example embodiment described above will be denoted by like reference characters, and descriptions of these portions will be omitted.

FIGS. 7 to 10C are views of a transfer 134 according to another example embodiment of the present disclosure. The transfer 134 of this example embodiment differs from the transfer 22 of the first example embodiment in that a cam engaging member 136 is connected to a nut member 140 of a screw mechanism 138, a drum cam 142 is connected to the fork shaft 102 via a standby mechanism 144, the shapes of a thrust bearing 154 and a stopper member 156 provided in a first transmitting mechanism (the first transmitting mechanism) 88d are different, and the shape of the standby mechanism 144 provided in the second transmitting mechanism (the second transmitting mechanism) 88e is different. As for the rest, the transfer 134 of this example embodiment is substantially the same as the transfer 22 of the first example embodiment.

Figure 7:
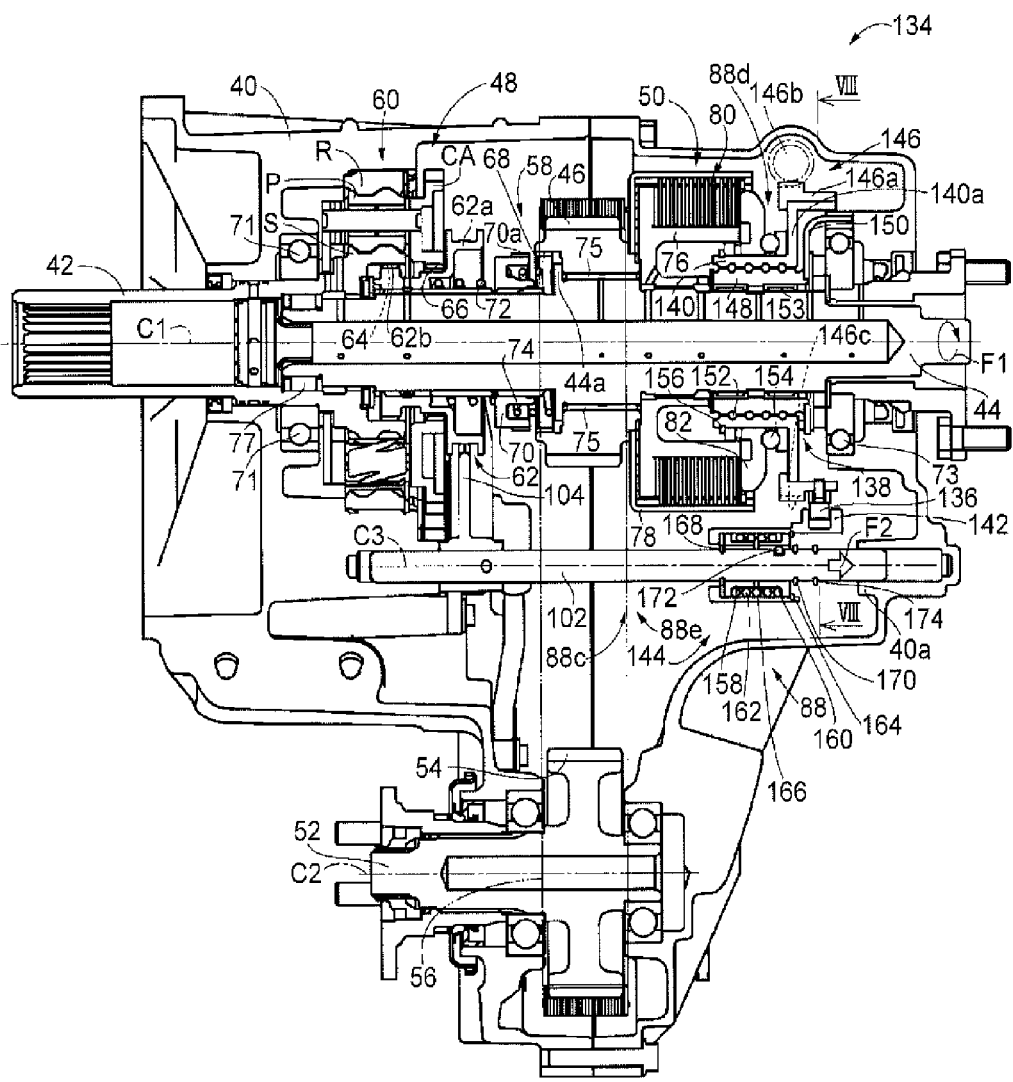
FIG. 7 is a sectional view schematically showing the structure of a transfer according to a second example embodiment of the present disclosure.
Figure 9:
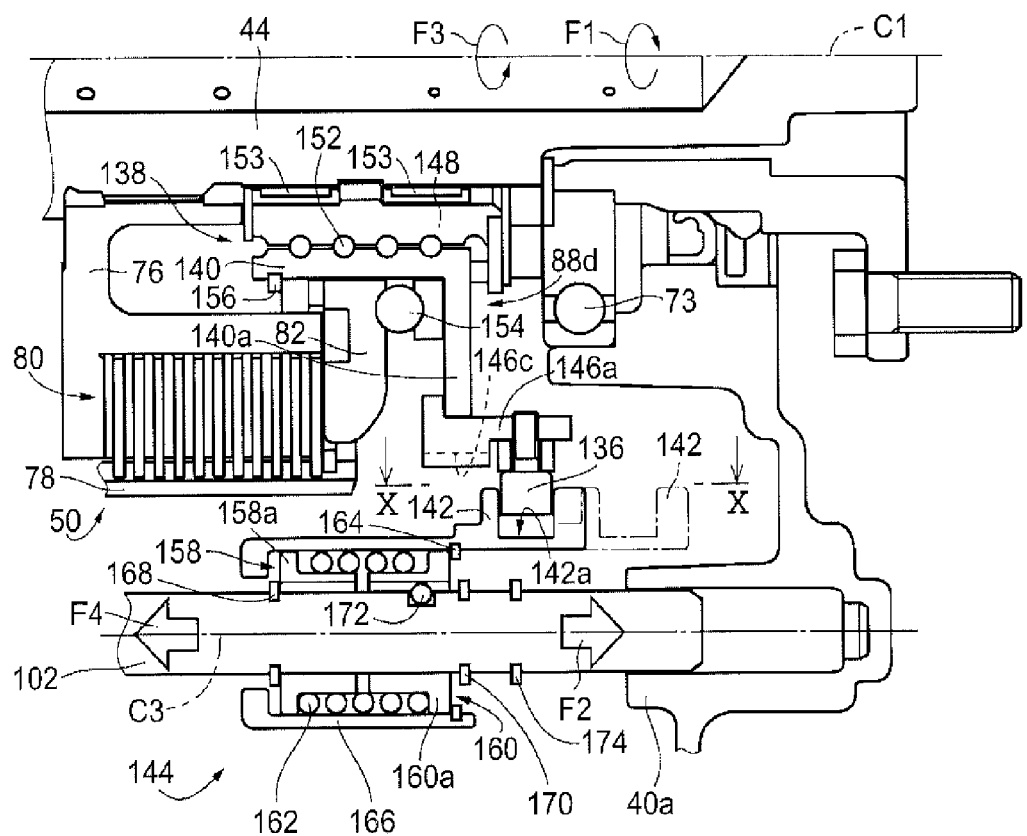
FIG. 9 is an enlarged view of a portion of the transfer shown in FIG. 7.

As shown in FIGS. 7 and 9, the screw mechanism 138 is arranged around the same first axis C1 as the rear-wheel side output shaft 44, on the opposite side of the front-wheel drive clutch 50 than the drive gear 46, and includes a nut member 140 as a rotating member that is indirectly connected to the electric motor 84 via a worm gear 146 provided in the transfer 134, a threaded shaft member 148 that screws together with the nut member 140, and a connecting member 150 connects a rear-side end portion of the threaded shaft member 148 to the transfer case 40 that is a non-rotating member, in order to arrange the threaded shaft member 148 on the rear-wheel side output shaft 44 in a manner unable to move in the direction of the first axis C1 of the rear-wheel side output shaft 44 and unable to rotate around the first axis C1. The nut member 140 screws together with the threaded shaft member 148 via a plurality of balls 152, and the screw mechanism 138 is a ball screw in which the nut member 140 and the threaded shaft member 148 operate via the plurality of balls 152. Also, the threaded shaft member 148 is relatively rotatably supported by the rear-wheel side output shaft 44 via a needle bearing 153. With the screw mechanism 138 structured in this way, the nut member 140, of the threaded shaft member 148 and the nut member 140 that are supported by the rear-wheel side output shaft 44 and screw together, moves in the direction of the first axis C1 of the rear-wheel side output shaft 44 by being rotatably driven by the electric motor 84. That is, the screw mechanism 138 converts the rotation of the electric motor 84 transmitted to the nut member 140 into linear motion of the nut member 140. Of the nut member 140 and the threaded shaft member 148 that are supported by the rear-wheel side output shaft 44, the nut member 140 is rotatably supported around the first axis C1 of the rear-wheel side output shaft 44 by the rear-wheel side output shaft 44, by screwing together with the threaded shaft member 148, and the threaded shaft member 148 is supported by the rear-wheel side output shaft 44 in a manner unable to move in the direction of the first axis C1 of the rear-wheel side output shaft 44 and unable to rotate around the first axis C1 of the rear-wheel side output shaft 44, by the connecting member 150. Also, in this example embodiment, when the nut member 140 is rotated in the direction of arrow F1 around the first axis C1 by the electric motor 84 as shown in FIGS. 7 and 9, the nut member 140 moves in a direction away from the front-wheel drive clutch 50, i.e., in the direction of arrow F2, in direction of the first axis C1, by the screwing action with the threaded shaft member 148.

The first transmitting mechanism 88d that transmits the linear motion of the nut member 140 in the screw mechanism 138 to the front-wheel drive clutch 50 includes the thrust bearing 154 interposed between the piston 82 and a flange portion 140a of the nut member 140, and an annular stopper member 156 that prevents relative movement of the piston 82 toward the friction engagement element 80 side with respect to the nut member 140, as shown in FIG. 9. The piston 82 is connected to the nut member 140 in a manner unable to move relative to the nut member 140 in the direction of the first axis C1 and able to rotate relative to the nut member 140 around the first axis C1, by the thrust bearing 154 and the stopper member 156. As a result, the linear motion of the nut member 140 in the screw mechanism 138 is transmitted to the piston 82 of the front-wheel drive clutch 50 via the first transmitting mechanism 88d.

Figure 8:
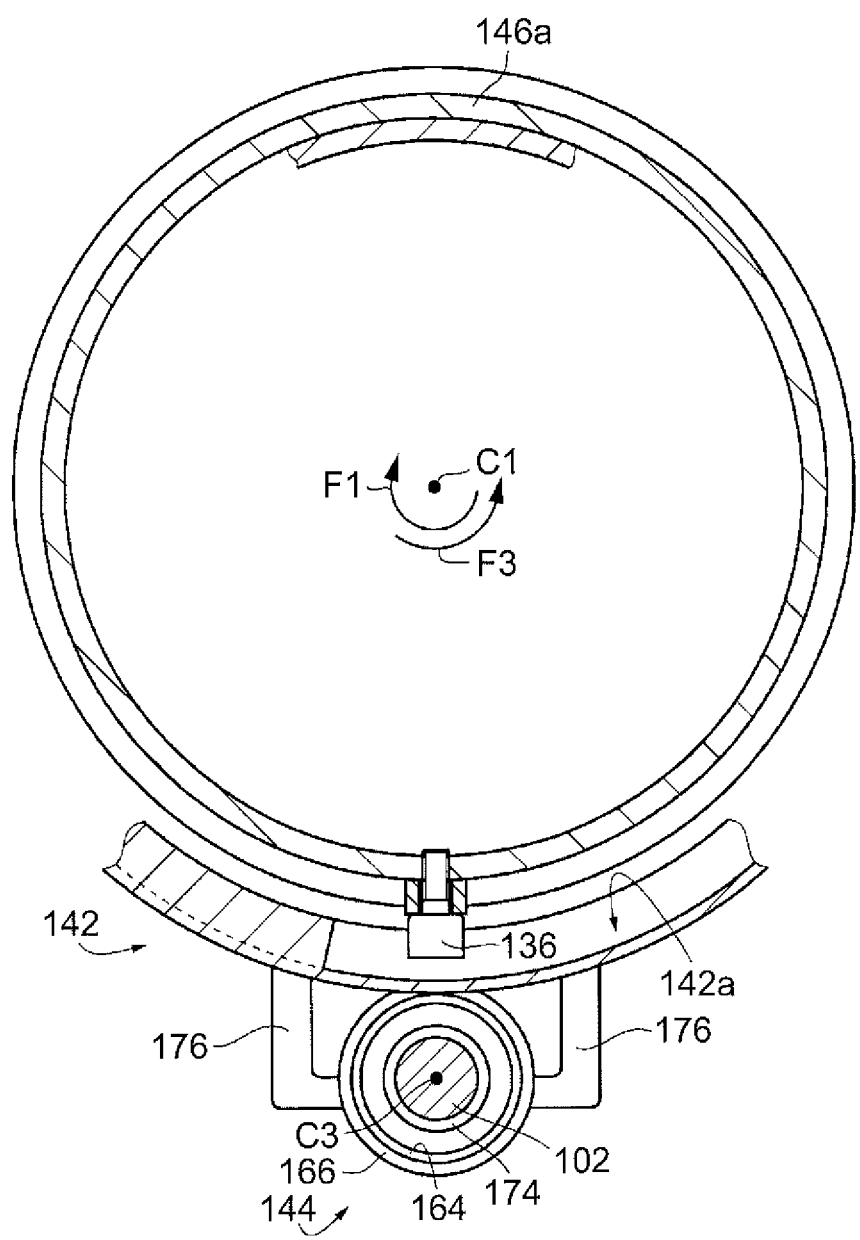
FIG. 8 is a sectional view taken along line VIII-VIII in FIG. 7.

The cam engaging member 136 is connected (fastened) to an annular worm wheel 146a of the worm gear 146, as shown in FIGS. 7 to 9, and when the worm wheel 146a is rotated around the first axis C1 of the rear-wheel side output shaft 44 by the electric motor 84 via a worm 146b, the cam engaging member 136 rotates around the first axis C1 of the rear-wheel side output shaft 44, together with the nut member 140. The worm wheel 146a moves in the direction of the first axis C1 of the rear-wheel side output shaft 44 by the electric motor 84 being rotatably driven. However, even when the worm wheel 146a moves in the first axis C1, outer peripheral teeth 146c of the worm wheel 146a are formed as spur teeth, such that the worm wheel 146a is in constant mesh with the worm 146b formed on the motor shaft of the electric motor 84.

The standby mechanism 144 includes a pair of flanged cylindrical members 158 and 160, a spring member 162, a grasping member 166, a first stopper 168 and a second stopper 170, and a rotation preventing ball 172, as shown in FIG. 9. The pair of flanged cylindrical members 158 and 160 are arranged so as to be able to slide on the fork shaft 102, and each have a flange portion 158a and 160a formed on one end portion, respectively. The spring member 162 is arranged in a preloaded state between the flange portions 158a and 160a, on the pair of flanged cylindrical members 158 and 160. The grasping member 166 has an annular stopper member 164, and grasps the pair of flanged cylindrical members 158 and 160 in a manner that enables the pair of flanged cylindrical members 158 and 160 to slide in a direction parallel to the third axis C3. The first stopper 168 and the second stopper 170 both have an annular shape and stop the pair of flanged cylindrical members 158 and 160 from sliding equal to or greater than a predetermined distance apart in the direction parallel to the third axis C3, on the fork shaft 102. The rotation preventing ball 172 has a spherical shape and prevents the pair of flanged cylindrical members 158 and 160 from rotating around the third axis C3 with respect to the fork shaft 102. With the standby mechanism 144 structured as described above, when the drum cam 142 moves in the direction of arrow F2, for example, the fork shaft 102 moves in the direction of arrow F2 by the grasping member 166 abutting against the flange portion 158a of the flanged cylindrical member 158, and further, the flange portion 160a of the flanged cylindrical member 160 abutting against the second stopper 170 via the spring member 162. Also, when the drum cam 142 moves in the direction opposite the direction of arrow F2, i.e., in the direction of arrow F4, for example, the fork shaft 102 moves in the direction of arrow F4 by the stopper member 164 provided on the grasping member 166 abutting against the flange portion 160a of the flanged cylindrical member 160, and further, the flange portion 158a of the flanged cylindrical member 158 abutting against the first stopper 168 via the spring member 162. When the fork shaft 102 is in the high gear position and the drum cam 142 tries to move in the direction of arrow F4, for example, the drum cam 142 is allowed to move in the direction of arrow F4 by the spring member 162 compressing and the flanged cylindrical member 160 moving in the direction toward the flanged cylindrical member 158. Also, when the fork shaft 102 is in the low gear position and the drum cam 142 tries to move in the direction of arrow F2, for example, the drum cam 142 is allowed to move in the direction of arrow F2 by the spring member 162 compressing and the flanged cylindrical member 158 moving in the direction toward the flanged cylindrical member 160. A supporting portion 40a that supports an end portion on the rear wheel 16 side of the fork shaft 102 is formed on the transfer case 40, and an annular stopper 174 that prevents the fork shaft 102 from moving in the direction of arrow F2 from the low gear position by abutting against the supporting portion 40a of the transfer case 40 when the fork shaft 102 is in the low gear position, is integrally provided on the fork shaft 102. Also, although not shown, a stopper member that prevents the fork shaft 102 from moving in the direction of arrow F4 from the high gear position, is provided on the transfer 134. Further, the drum cam 142 is integrally connected to the grasping member 166 of the standby mechanism 144, and a pair of reinforcing members 176 that improve the strength of the connection between the drum cam 142 and the grasping member 166 are connected, as shown in FIG. 8, between the drum cam 142 and the grasping member 166.

The drum cam 142 is formed in a partial cylindrical shape following an outer periphery of the worm wheel 146a, and the drum cam 142 is arranged adjacent to the worm wheel 146a such that the cam engaging member 136 engages with a cam groove 142a formed on an inner periphery of the drum cam 142, i.e., such that the cam engaging member 136 is arranged inside the cam groove 142a, as shown in FIG. 8.

Figure 10A:
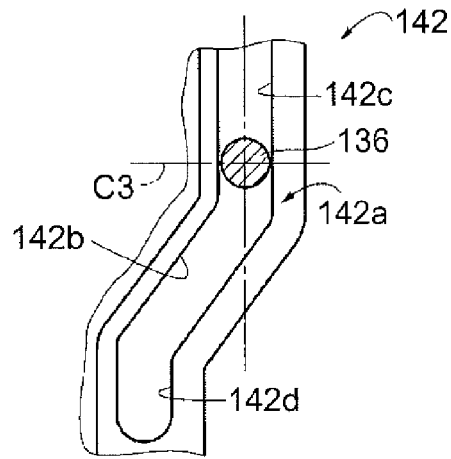
FIG. 10A is a sectional view taken along line X-X in FIG. 9, and shows the position of a drum cam that is connected to a fork shaft when the fork shaft is in a high gear position.
Figure 10B:
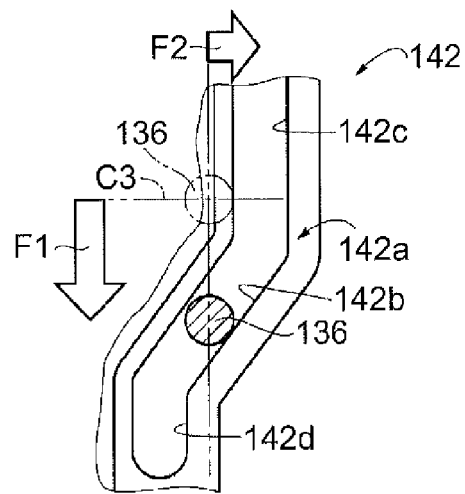
FIG. 10B is a sectional view taken along line X-X in FIG. 9, and shows the position of the drum cam that is connected to the fork shaft when the fork shaft is in the middle of switching from the high gear position to a low gear position.
Figure 10C:
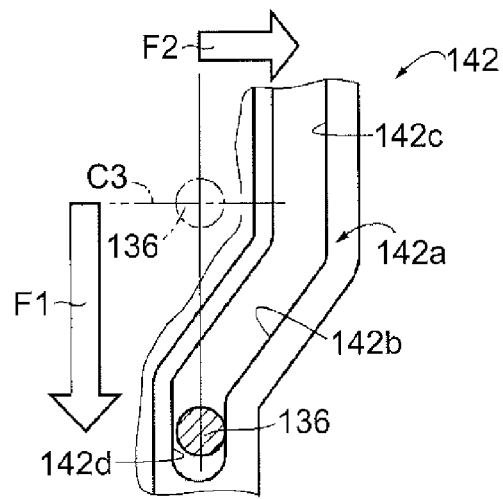
FIG. 10C is a sectional view taken along line X-X in FIG. 9, and shows the position of the drum cam that is connected to the fork shaft when the fork shaft is in the low gear position.

As shown in FIGS. 10A to 10C, the cam groove 142a formed on the inner periphery of the drum cam 142 includes an inclined cam groove portion 142b that extends in a direction inclined with respect to the third axis C3 of the fork shaft 102, a first cam groove portion 142c as the switching cam groove portion that is formed on an end portion of the inclined cam groove portion 142b that is on the side opposite the standby mechanism 144 side, and extends in a direction perpendicular to the third axis C3, and a second cam groove portion 142d that is formed on an end portion of the inclined cam groove portion 142b that is on the standby mechanism 144 side, and extends in a direction perpendicular to the third axis C3. With the drum cam 142 structured in this way, when the cam engaging member 136 is rotated in the direction of arrow F1 around the first axis C1 as the nut member 140 is rotated in the direction of arrow F1 around the first axis C1 by the electric motor 84, from the state in which the cam engaging member 136 is arranged inside the end portion on the inclined cam groove portion 142b side of the first cam groove portion 142c of the cam groove 142a, as shown in FIG. 10A, for example, the drum cam 142 is moved along the inclined cam groove portion 142b in the direction of arrow F2, i.e., in the direction of the third axis C3 of the fork shaft 102, by an amount of movement that is greater than the amount of movement of the nut member 140 in the direction of arrow F2, i.e., than the amount that the nut member 140 moves in the direction of arrow F2 by the screwing action of the nut member 140 with the threaded shaft member 148. Also, when the cam engaging member 136 is rotated in the direction opposite the direction of arrow F1 around the first axis C1 as the nut member 140 is rotated in the direction opposite the direction of arrow F1 around the first axis C1 by the electric motor 84, from the state in which the cam engaging member 136 is arranged inside the second cam groove portion 142d of the cam groove 142a, as shown in FIG. 10C, for example, the drum cam 142 is moved along the inclined cam groove portion 142b in the direction opposite the direction of arrow F2 (i.e., in the direction of arrow F4), i.e., in the direction of the third axis C3 of the fork shaft 102, by an amount of movement that is greater than the amount of movement of the nut member 140 in the direction opposite the direction of arrow F2, i.e., than the amount that the nut member 140 moves in the direction opposite the direction of arrow F2 by the screwing action of the nut member 140 with the threaded shaft member 148. That is, when the electric motor 84 is rotatably driven such that the cam engaging member 136 is rotated around the first axis C1 of the rear-wheel side output shaft 44 via the nut member 140, the drum cam 142 is moved in the direction of the third axis C3 of the fork shaft 102 by the cam engaging member 136 engaging with the cam groove 142a formed on the drum cam 142. In other words, when the electric motor 84 is rotatably driven such that the cam engaging member 136 is rotated around the first axis C1 of the rear-wheel side output shaft 44 via the nut member 140, the drum cam 142 is moved relative to the cam engaging member 136 in the direction of the third axis C3 of the fork shaft 102. The alternate long and short dash line circle shown in FIGS. 10B and 10C indicates the position of the cam engaging member 136 in FIG. 10A.

A second transmitting mechanism 88e that transmits the movement in the direction of the third axis C3 of the fork shaft 102 to which the drum cam 142 is connected, includes the fork shaft 102, the fork 104, and the standby mechanism 144 that transmits the movement of the drum cam 142 that is in the direction of the third axis C3 to the fork shaft 102 via the spring member 162, as shown in FIG. 7. Therefore, in the second transmitting mechanism 88e, when the drum cam 142 is moved in the direction of the arrow F2 from the state shown in FIG. 10A, for example, the high-low sleeve 62 is moved toward the drive gear 46 side, i.e., is moved to a position where the outer peripheral teeth 62b of the high-low sleeve 62 mesh with the low-side gear teeth 66. Also, when the drum cam 142 is moved in the direction opposite the direction of arrow F2 (i.e., in the direction of arrow F4), from the state shown in FIG. 10C, for example, the high-low sleeve 62 is moved toward the side away from the drive gear 46, i.e., is moved to a position where the outer peripheral teeth 62b of the high-low sleeve 62 mesh with the high-side gear teeth 64. Of FIGS. 10A to 10C, FIG. 10A is a view illustrating the position of the drum cam 142 when the fork shaft 102 is in the high gear position, FIG. 10C is a view illustrating the position of the drum cam 142 when the fork shaft 102 is in the low gear position, and FIG. 10B is a view illustrating the position of the drum cam 142 when the fork shaft 102 is in the middle of switching from the high gear position to the low gear position. Also, when the cam engaging member 136 that is engaged with the first cam groove portion 142c is rotated in the direction opposite the direction of arrow F1, i.e., in the direction of arrow F3, by the electric motor 84, from the state shown in FIG. 10A, for example, the piston 82 of the front-wheel drive clutch 50 is moved from a position in which the piston 82 is not pressed against the friction engagement element 80 to a position where the piston 82 is pressed against the friction engagement element 80, while the drum cam 142 does not move in the direction of the third axis C3 of the fork shaft 102, and the fork shaft 102 remains in the high gear position. That is, while the cam engaging member 136 is engaged inside the first cam groove portion 142c, movement of the drum cam 142 in the direction of the third axis C3 of the fork shaft 102, i.e., relative movement of the cam engaging member 136 and the drum cam 142 in the direction of the third axis C3 of the fork shaft 102, is prevented by the first cam groove portion 142c, regardless of the rotation in the direction opposite the direction of arrow F1 around the first axis C1, of the cam engaging member 136 that is connected to the nut member 140. In the high-low switching mechanism 48, the high-speed gear H is established when the fork shaft 102 is in the high gear position, and the low-speed gear L is established when the fork shaft 102 is in the low gear position.

As described above, with the transfer 134 of this example embodiment, when the nut member 140 is rotatably driven by the electric motor 84, the nut member 140 moves in the direction of the first axis C1 of the rear-wheel side output shaft 44, and the linear motion of the nut member 140 is transmitted to the front-wheel drive clutch 50 via the first transmitting mechanism 88d. Also, when the nut member 140 is rotatably driven by the electric motor 84, the cam engaging member 136 that is connected to the nut member 140 rotates and the drum cam 142 moves in the direction of the third axis C3 of the fork shaft 102, i.e., the cam engaging member 136 that is connected to the nut member 140 rotates and the drum cam 142 moves relative to the cam engaging member 136 in the direction of the third axis C3 of the fork shaft 102, and the movement of the fork shaft 102 along with the drum cam 142 is transmitted to the high-low switching mechanism 48 via the second transmitting mechanism 88e. Accordingly, the linear motion of the nut member 140 of the screw mechanism 138 provided on the rear-wheel side output shaft 44 is transmitted to the front-wheel drive clutch 50 via the first transmitting mechanism 88d, so there is no longer a need to provide a ball cam and a lever for adjusting the transfer torque of the front-wheel drive clutch 50, for example, as there is in the related art. Consequently, the distance between the rear-wheel side output shaft 44 and the fork shaft 102 is able to be suitably shortened, which enables the transfer 134 to be smaller in size.

Also, with the transfer 134 of this example embodiment, the electric motor 84 is connected to the nut member 140 of the cam engaging member 136 via the worm gear 146, the cam engaging member 136 is connected to the worm wheel 146a of the worm gear 146, the drum cam 142 is connected to the fork shaft 102, and the drum cam 142 is formed in a partial cylindrical shape following the outer periphery of the worm wheel 146a. Therefore, the drum cam 142 and the worm wheel 146a are able to be arranged adjacent to each other, so the distance between the rear-wheel side output shaft 44 and the fork shaft 102 is able to be suitably shortened.

Also, with the transfer 134 of this example embodiment, the cam groove 142a formed on the drum cam 142 includes the inclined cam groove portion 142b that extends in a direction inclined with respect to the third axis C3 of the fork shaft 102. When the nut member 140 is rotated around the first axis C1 of the rear-wheel-side output shaft 44 by the electric motor 84, the drum cam 142 is moved, due to the inclined cam groove portion 142b, in the direction of the third axis C3 of the fork shaft 102 by an amount of movement that is greater than the amount of movement of the nut member 140 in the direction of the first axis C1 of the rear-wheel-side output shaft 44. Therefore, the responsiveness of the switch between the high-speed gear H and the low-speed gear L in the high-low switching mechanism 48 is significantly improved compared to when the switch between the high-speed gear H and the low-speed gear L is achieved by the nut member 140 of the screw mechanism 138 moving in the direction of the first axis C1 of the rear-wheel-side output shaft 44, for example.

Also, with the transfer 134 of this example embodiment, the second transmitting mechanism 88e includes the standby mechanism 144 that transmits the movement of the drum cam 142 that is in the direction of the third axis C3 of the fork shaft 102, to the fork shaft 102 via the spring member 162. Therefore, when the high-low switching mechanism 48 switches between the high-speed gear H and the low-speed gear L, shock that accompanies the switch of the high-low switching mechanism 48 is absorbed by the spring member 162 of the standby mechanism 144.

Next, a third example embodiment of the present disclosure will be described. Portions common to the second example embodiment described above will be denoted by like reference characters, and descriptions of these portions will be omitted.

FIGS. 11 to 17C are views of a transfer 178 according to another example embodiment of the present disclosure. The transfer 178 of this example embodiment differs from the transfer 134 of the second example embodiment in that the shapes of a cam engaging member 180 and a drum cam 182 are different, and the outer peripheral teeth 70a of a locking sleeve 70 do not mesh with the locking teeth 68 when the fork shaft 102 is in the low gear position. As for the rest, the transfer 178 of this example embodiment is substantially the same as the transfer 134 of the second example embodiment.

Figure 11:
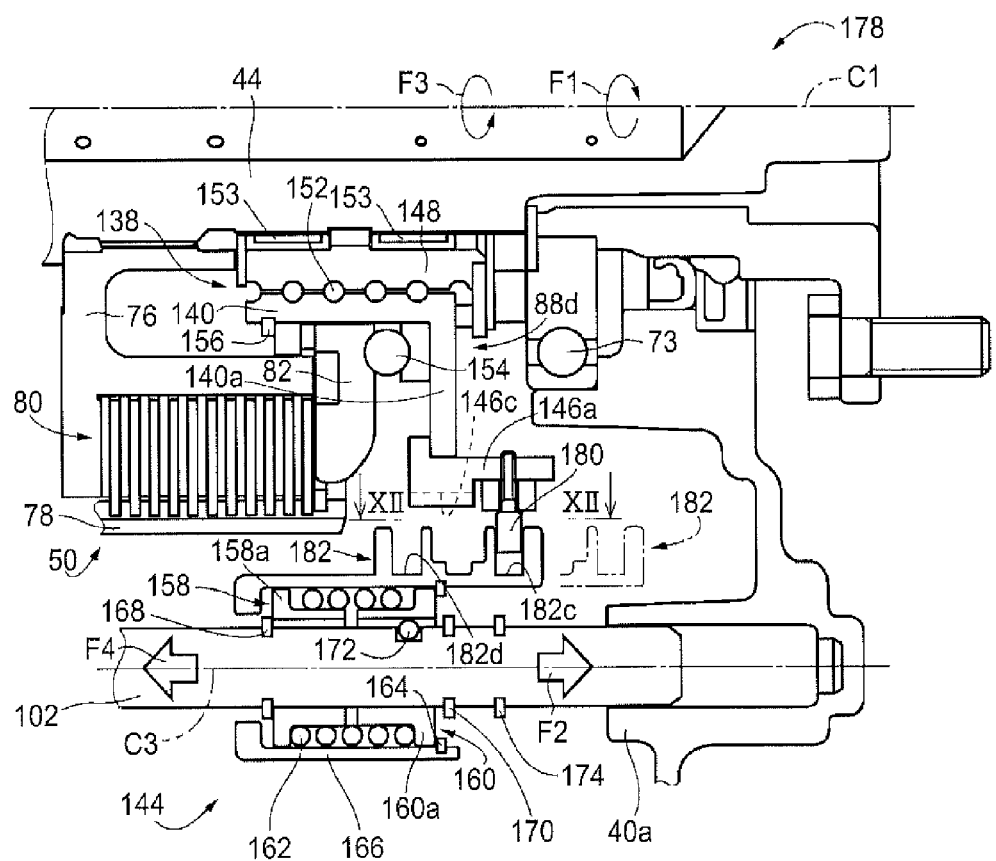
FIG. 11 is a view schematically showing the structure of a transfer according to a third example embodiment of the present disclosure, and is an enlarged view of a portion of the transfer.

The cam engaging member 180 is connected (fastened) to the annular worm wheel 146a of the worm gear 146, as shown in FIG. 11, so when the worm wheel 146a is rotated around the first axis C1 of the rear-wheel side output shaft 44 by the electric motor 84 via the worm 146b, the cam engaging member 180 rotates around the first axis C1 of the rear-wheel side output shaft 44, together with the nut member 140.

The drum cam 182 is integrally connected to the grasping member 166 of the standby mechanism 144, and a pair of reinforcing members that are not shown but that are similar to the pair of reinforcing members 176 shown in FIG. 8, for example, are connected between the drum cam 182 and the grasping member 166. Also, the drum cam 182 is formed in a partial cylindrical shape following an outer periphery of the worm wheel 146a, and the drum cam 182 is arranged adjacent to the worm wheel 146a such that the cam engaging member 180 engages with a cam groove 182a formed on an inner periphery of the drum cam 182, i.e., such that the cam engaging member 180 is arranged inside the cam groove 182a.

Figure 12:
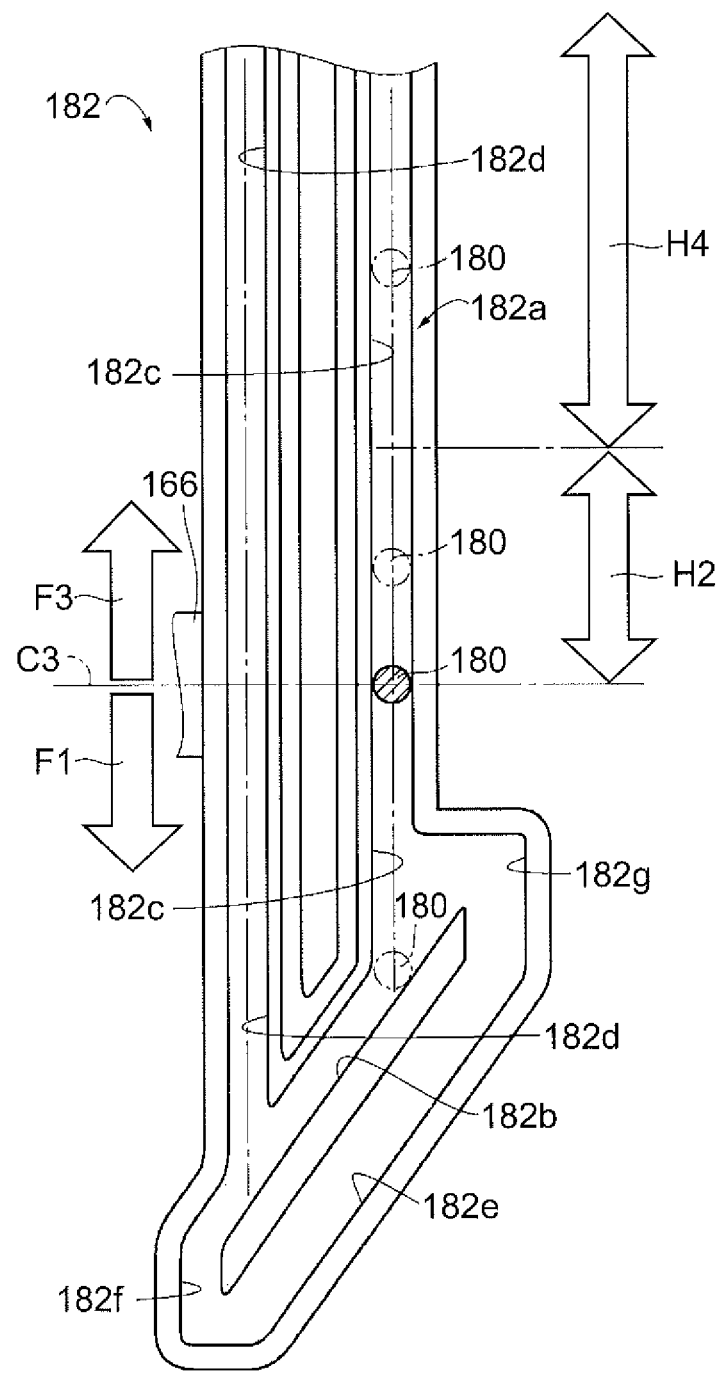
FIG. 12 is a sectional view taken along line XII-XII in FIG. 11, and shows the position of a drum cam that is connected to a fork shaft when the fork shaft is in a high gear position.
Figure 14:
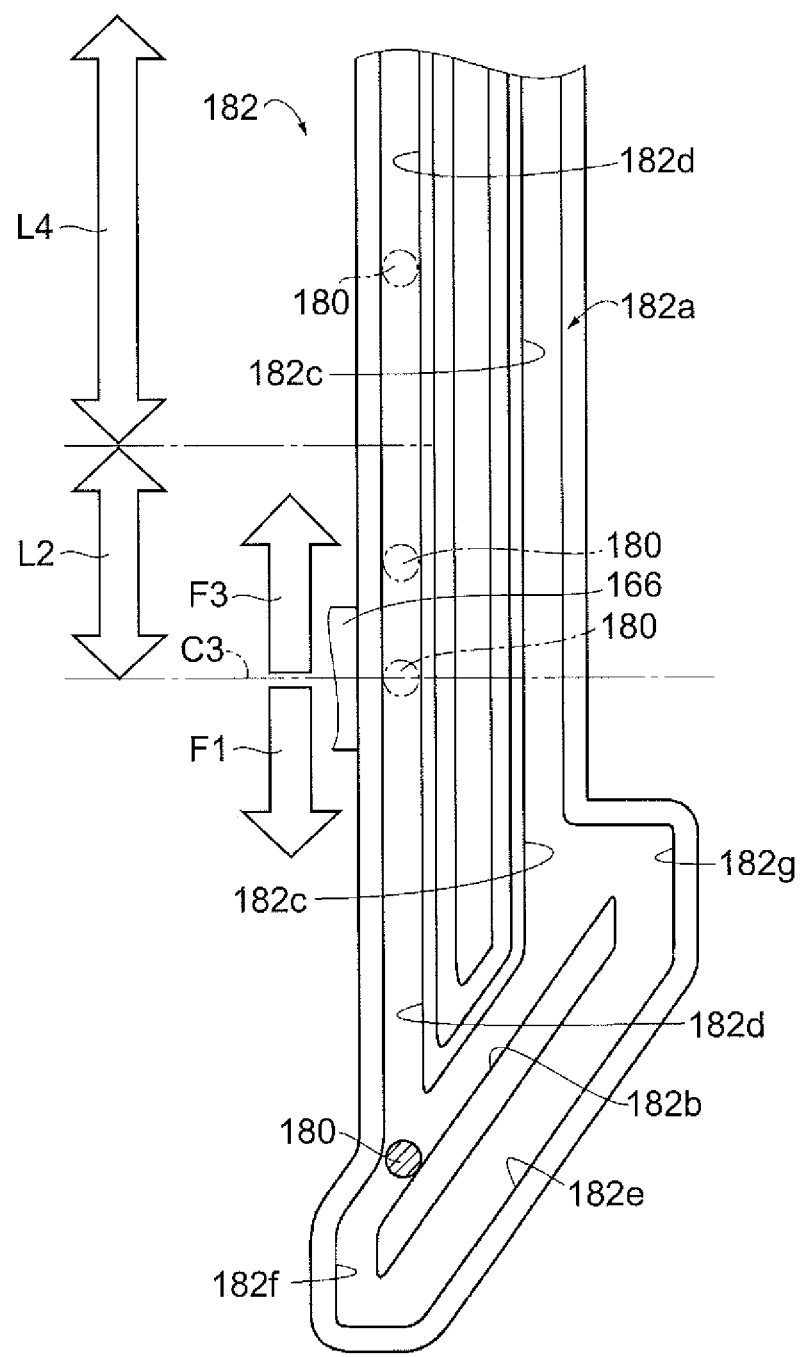
FIG. 14 is a sectional view taken along line XII-XII in FIG. 11, and shows the position of the drum cam that is connected to the fork shaft when the fork shaft is in the low gear position.

As shown in FIGS. 12 and 14, the cam groove 182a formed on the inner periphery of the drum cam 182 includes a first inclined cam groove portion (an inclined cam groove portion) 182b that extends in a direction inclined with respect to the third axis C3 of the fork shaft 102, a first switching cam groove portion 182c as the switching cam groove portion that is formed on an end portion of the first inclined cam groove portion 182b that is on the rear wheel 16 side, and extends in a direction perpendicular to the third axis C3 of the fork shaft 102, a second switching cam groove portion (a switching cam groove portion) 182d that is formed on an end portion of the first inclined cam groove portion 182b that is on the side opposite the rear wheel 16 side, and extends in a direction perpendicular to the third axis C3 of the fork shaft 102, a second inclined cam groove portion 182e as the switching cam groove portion that extends in a direction inclined with respect to the third axis C3 of the fork shaft 102, a first connecting groove portion 182f that connects the end portion of the first inclined cam groove portion 182b that is on the side opposite the rear wheel 16 side to an end portion of the second inclined cam groove portion 182e that is on the side opposite the rear wheel 16 side, and a second connecting groove portion 182g that connects the end portion of the first inclined cam groove portion 182b that is on the rear wheel 16 side to an end portion of the second inclined cam groove portion 182e that is on the rear wheel 16 side. The first inclined cam groove portion 182b and the second inclined cam groove portion 182e are arranged facing each other. Also, FIG. 12 is a view showing the position of the drum cam 182 when the fork shaft 102 is in the high gear position, and FIG. 14 is a view showing the position of the drum cam 182 when the fork shaft 102 is in the low gear position.

As shown in FIG. 12, the first switching cam groove portion 182c is such that, when the cam engaging member 180 is engaged with the first switching cam groove portion 182c, even if the nut member 140, i.e., the cam engaging member 180, is rotated around the first axis C1 of the rear-wheel side output shaft 44 by the electric motor 84, the first switching cam groove portion 182c extends in a direction perpendicular to the third axis C3, so the drum cam 182 will not move in the direction of the third axis C3 of the fork shaft 102. That is, when the cam engaging member 180 is engaged with the first switching cam groove portion 182c, relative rotation between the cam engaging member 180 and the drum cam 182 in the direction of the third axis C3 of the fork shaft 102 is prevented regardless of rotation of the nut member 140 around the first axis C1 of the rear-wheel side output shaft 44. Therefore, when the cam engaging member 180 is rotated in the direction of arrow F3 around the first axis C1 by the electric motor 84, from the state in which the cam engaging member 180 is engaged with the first switching cam groove portion 182c, the piston 82 of the front-wheel drive clutch 50 is moved from a position in which the piston 82 is not pressed against the friction engagement element 80 to a position in which the piston 82 is pressed against the friction engagement element 80, while the fork shaft 102 remains in the high gear position. In FIG. 12, a rotation range of the cam engaging member 180 where the fork shaft 102 is in the high gear position and the piston 82 of the front-wheel drive clutch 50 is not pressed against the friction engagement element 80, i.e., where the fork shaft 102 is in the high gear position and the front-wheel drive clutch 50 is released, in a range where the cam engaging member 180 that is engaged with the first switching cam groove portion 182c is rotated in the direction of arrow F3 by the electric motor 84, is indicated as a first range 112. Also, in FIG. 12, a rotation range of the cam engaging member 180 where the fork shaft 102 is in the high gear position and the piston 82 of the front-wheel drive clutch 50 is pressed against the friction engagement element 80, i.e., where the fork shaft 102 is in the high gear position and the front-wheel drive clutch 50 is engaged, in the range where the cam engaging member 180 that is engaged with the first switching cam groove portion 182c is rotated in the direction of arrow F3 by the electric motor 84, is indicated as a second range 114.

Figure 13A:
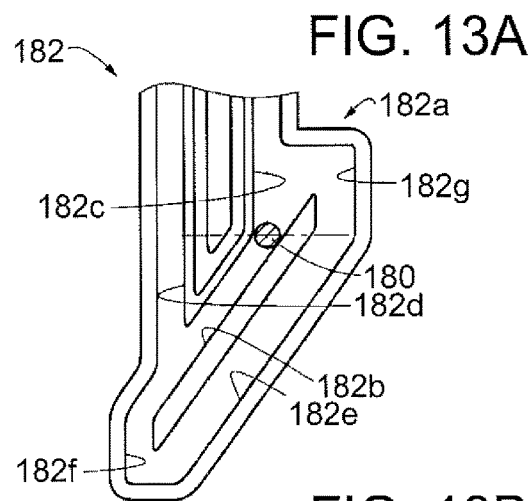
FIG. 13A a sectional view taken along line XII-XII in FIG. 11, and shows the position of the drum cam that is connected to the fork shaft when the fork shaft is in the high gear position.
Figure 13B:
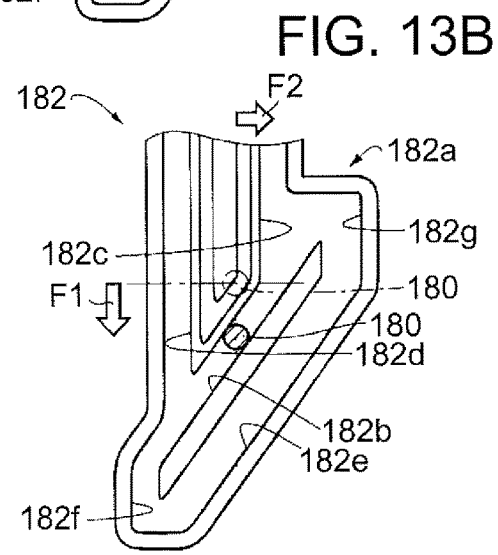
FIG. 13B is a sectional view taken along line XII-XII in FIG. 11, and shows the position of the drum cam that is connected to the fork shaft when the fork shaft is in the middle of switching from the high gear position to a low gear position.
Figure 13C:
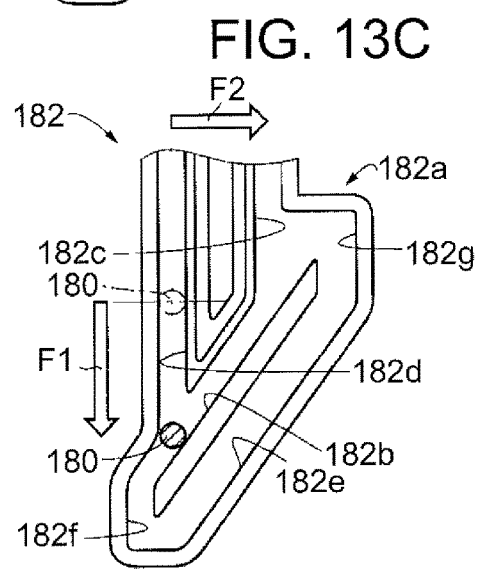
FIG. 13C is a sectional view taken along line XII-XII in FIG. 11, and shows the position of the drum cam that is connected to the fork shaft when the fork shaft is in the low gear position.

FIGS. 13A to 13C are views showing the position of the drum cam 182 with respect to the cam engaging member 180 when the fork shaft 102 is switched from the high gear position to the low gear position. When the cam engaging member 180 is rotated in the direction of arrow F1 around the first axis C1 as the nut member 140 is rotated in the direction of arrow F1 around the first axis C1 by the electric motor 84, from the state in which the cam engaging member 180 is engaged inside the end portion of the first inclined cam groove portion 182b that is on the rear wheel 16 side, as shown in FIG. 13A, the drum cam 182 is moved along the first inclined cam groove portion 182b in the direction of arrow F2, i.e., in the direction of the third axis C3 of the fork shaft 102, by an amount of movement that is greater than the amount of movement of the nut member 140 in the direction of arrow F2, i.e., than the amount that the nut member 140 moves in the direction of arrow F2 by the screwing action of the nut member 140 with the threaded shaft member 148. FIG. 13A is a view showing the position of the drum cam 182 when the fork shaft 102 is in the high gear position, FIG. 13C is a view showing the position of the drum cam 182 when the fork shaft 102 is in the low gear position, and FIG. 13B is a view showing the position of the drum cam 182 when the fork shaft 102 is in the middle of switching from the high gear position to the low gear position. Also, the alternate long and short dash line circle shown in FIGS. 13B and 13C indicates the position of the cam engaging member 180 in FIG. 13A.

As shown in FIG. 14 in which the position of the drum cam 182 with respect to the cam engaging member 180 is the same as that shown in FIG. 13C, the second switching cam groove portion 182d is such that, when the cam engaging member 180 is engaged with the end portion on the first inclined cam groove portion 182b side of the second switching cam groove portion 182d, even if the nut member 140, i.e., the cam engaging member 180, is rotated in the direction of arrow F3 around the first axis C1 of the rear-wheel side output shaft 44 by the electric motor 84, the second switching cam groove portion 182d extends in a direction perpendicular to the third axis C3, so the drum cam 182 will not move in the direction of the third axis C3 of the fork shaft 102. That is, when the cam engaging member 180 is engaged with the second switching cam groove portion 182d, relative rotation between the cam engaging member 180 and the drum cam 182 in the direction of the third axis C3 of the fork shaft 102 is prevented regardless of rotation of the nut member 140 around the first axis C1 of the rear-wheel side output shaft 44. Therefore, when the cam engaging member 180 is rotated in the direction of arrow F3 around the first axis C1 by the electric motor 84, from the state in which the cam engaging member 180 is engaged with the end portion on the first inclined cam groove portion 182b side of the second switching cam groove portion 182d, the piston 82 of the front-wheel drive clutch 50 is moved from a position in which the piston 82 is not pressed against the friction engagement element 80 to a position in which the piston 82 is pressed against the friction engagement element 80, while the fork shaft 102 remains in the low gear position. In FIG. 14, a rotation range of the cam engaging member 180 where the fork shaft 102 is in the low gear position and the piston 82 of the front-wheel drive clutch 50 is not pressed against the friction engagement element 80, i.e., where the fork shaft 102 is in the low gear position and the front-wheel drive clutch 50 is released, in a range where the cam engaging member 180 that is engaged with the second switching cam groove portion 182d is rotated in the direction of arrow F3 by the electric motor 84, is indicated as a first range L2. Also, in FIG. 14, a rotation range of the cam engaging member 180 where the fork shaft 102 is in the low gear position and the piston 82 of the front-wheel drive clutch 50 is pressed against the friction engagement element 80, i.e., where the fork shaft 102 is in the low gear position and the front-wheel drive clutch 50 is engaged, in the range where the cam engaging member 180 that is engaged with the second switching cam groove portion 182d is rotated in the direction of arrow F3 by the electric motor 84, is indicated as a second range L4.

Figure 15A:
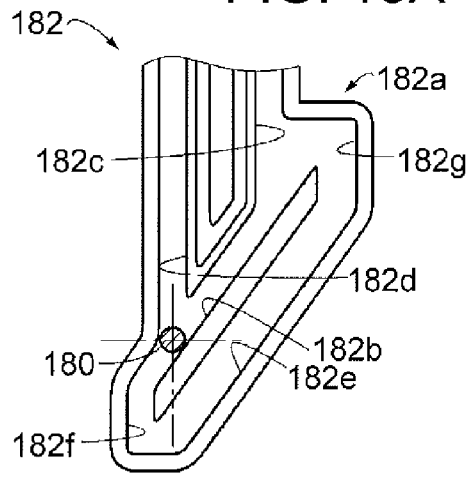
FIG. 15A is a sectional view taken along line XII-XII in FIG. 11, and shows the position of the drum cam that is connected to the fork shaft when the fork shaft is in the low gear position.
Figure 15B:
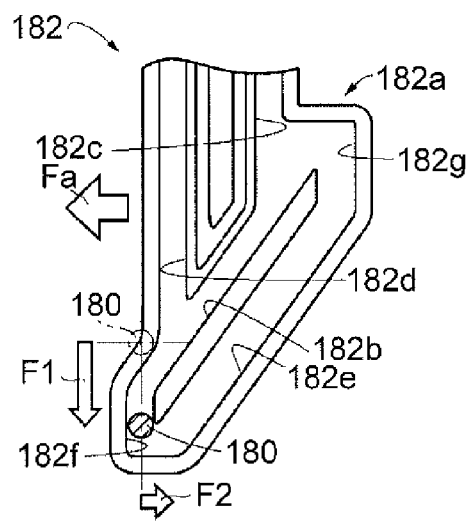
FIG. 15B is a sectional view taken along line XII-XII in FIG. 11, and shows a state in which a spring member of a standby mechanism provided in the transfer is compressed and urging force of the spring member is applied to the drum cam while the drum cam is in the middle of moving from the position shown in FIG. 15A to the position shown in FIG. 15C.
Figure 15C:
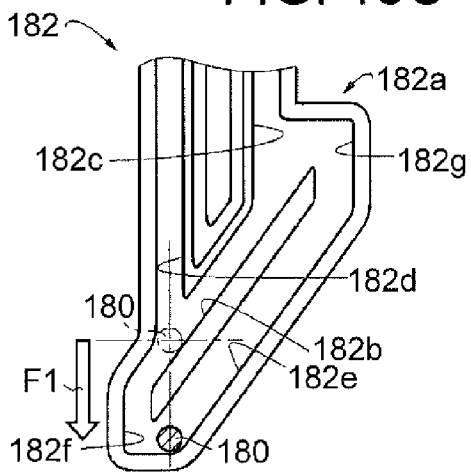
FIG. 15C is a sectional view taken along line XII-XII in FIG. 11, and shows the position of the drum cam that is connected to the fork shaft when the fork shaft is in the low gear position.

As shown in FIG. 15A in which the position of the drum cam 182 with respect to the cam engaging member 180 is the same as that shown in FIGS. 13C and 14, when the cam engaging member 180 is rotated in the direction of arrow F1 around the first axis C1 as the nut member 140 is rotated in the direction of arrow F1 around the first axis C1 by the electric motor 84, from a state in which the cam engaging member 180 is engaged with the end portion on the first inclined cam groove portion 182b side of the second switching cam groove portion 182d, i.e., with the end portion of the first inclined cam groove portion 182b that is on the side opposite the rear wheel 16 side, the drum cam 142 is moved along the first connecting groove portion 182f in the direction of arrow F2, as shown in FIG. 15B. FIG. 15A is a view showing the position of the drum cam 182 when the fork shaft 102 is in the low gear position, and FIG. 15B is a view showing a position of the drum cam 182 that has moved farther in the direction of arrow F2 from the position it is in when the fork shaft 102 is in the low gear position. As shown in FIG. 15B, when the drum cam 182 moves farther in the direction of arrow F2 from the position it is in when the fork shaft 102 is in the low gear position, i.e., when the drum cam 182 moves farther in the direction of arrow F2 from the position it is in when a stopper 174 (see FIG. 11) provided on the fork shaft 102 is abutting against the supporting portion 40a of the transfer case 40, the spring member 162 of the standby mechanism 144 is compressed, so urging force Fa in the direction opposite the direction of arrow F2 is applied to the drum cam 182 by the elastic restoring force of the spring member 162. Therefore, when the cam engaging member 180 is rotated in the direction of arrow F1 around the first axis C1 by the electric motor 84, from the state in which the cam engaging member 180 is engaged with the first connecting groove portion 182f as shown in FIG. 15B, the drum cam 182 moves in the direction opposite the direction of arrow F2 by the urging force Fa, and the cam engaging member 180 engages with the end portion of the second inclined cam groove portion 182e that is on the side opposite the rear wheel 16 side as shown in FIG. 15C. The alternate long and short dash line circle shown in FIGS. 15B and 15C indicates the position of the cam engaging member 180 in FIG. 15A.

Figure 16A:
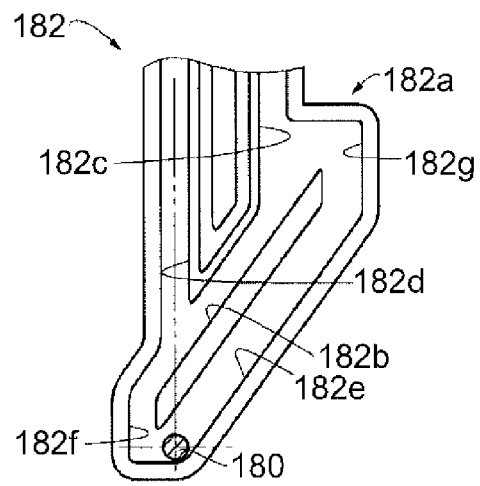
FIG. 16A is a sectional view taken along line XII-XII in FIG. 11, and shows the position of the drum cam that is connected to the fork shaft when the fork shaft is in the low gear position.
Figure 16B:
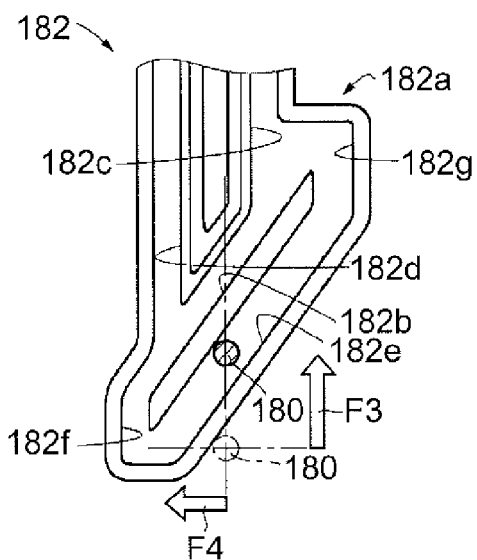
FIG. 16B is a sectional view taken along line XII-XII in FIG. 11, and shows the position of the drum cam that is connected to the fork shaft when the fork shaft is in the middle of switching from the low gear position to the high gear position.
Figure 16C:
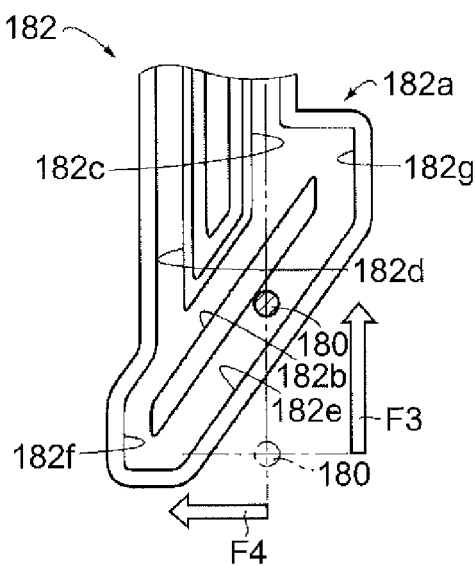
FIG. 16C a sectional view taken along line XII-XII in FIG. 11, and shows the position of the drum cam that is connected to the fork shaft when the fork shaft is in the high gear position.

FIGS. 16A to 16C are views showing the position of the drum cam 182 with respect to the cam engaging member 180 when the fork shaft 102 is switched from the low gear position to the high gear position. As shown in FIG. 16A in which the position of the drum cam 182 with respect to the cam engaging member 180 is the same as that shown in FIG. 15C, when the cam engaging member 180 is rotated in the direction of arrow F3 around the first axis C1 as the nut member 140 is rotated in the direction of arrow F3 around the first axis C1 by the electric motor 84, from the state in which the cam engaging member 180 is engaged inside the end portion of the second inclined cam groove portion 182e that is on the side opposite the rear wheel 16 side, the drum cam 182 is moved along the second inclined cam groove portion 182e in the direction of arrow F4 by an amount of movement that is greater than the amount of movement of the nut member 140 in the direction opposite the direction of arrow F2 (i.e., in the direction of arrow F4), i.e., than the amount that the nut member 140 moves in the direction of arrow F4 by the screwing action of the nut member 140 with the threaded shaft member 148. FIG. 16A is a view showing the position of the drum cam 182 when the fork shaft 102 is in the low gear position, FIG. 16C is a view showing the position of the drum cam 182 when the fork shaft 102 is in the high gear position, and FIG. 16B is a view showing the position of the drum cam 182 while the fork shaft 102 is in the middle of switching from the low gear position to the high gear position. Also, the alternate long and short dash line circle shown in FIGS. 16B and 16C indicates the position of the cam engaging member 180 in FIG. 16A.

Figure 17A:
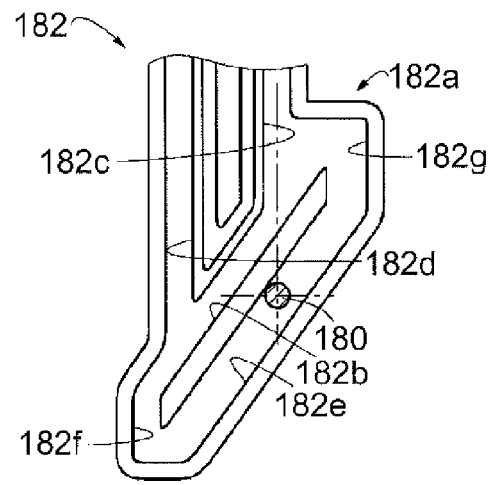
FIG. 17A a sectional view taken along line XII-XII in FIG. 11, and shows the position of the drum cam when the fork shaft is in the high gear position.
Figure 17B:
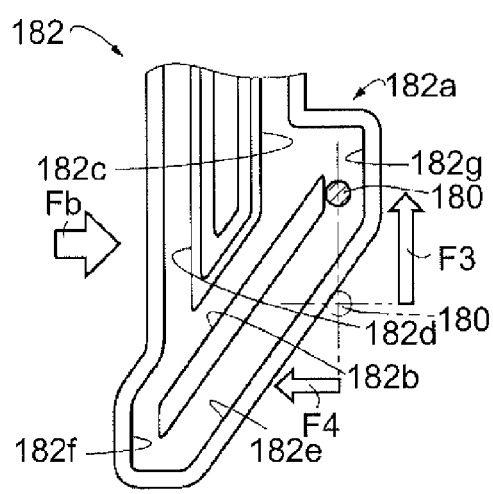
FIG. 17B is a sectional view taken along line XII-XII in FIG. 11, and shows a state in which the spring member of the standby mechanism provided in the transfer is compressed and urging force of the spring member is applied to the drum cam while the drum cam is in the middle of moving from the position shown in FIG. 17A to the position shown in FIG. 17C.
Figure 17C:
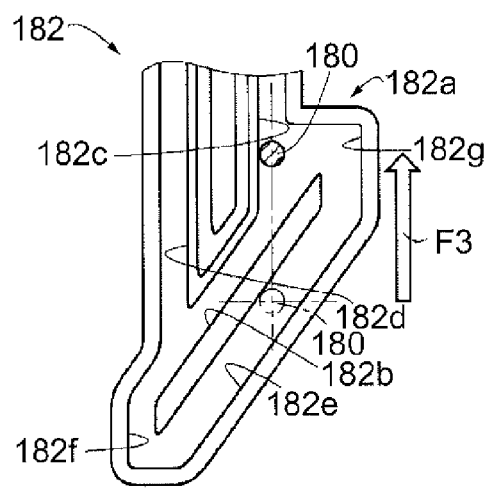
FIG. 17C a sectional view taken along line XII-XII in FIG. 11, and shows the position of the drum cam when the fork shaft is in the high gear position.

As shown in FIG. 17A in which the position of the drum cam 182 with respect to the cam engaging member 180 is the same as that shown in FIG. 16C, when the cam engaging member 180 is rotated in the direction of arrow F3 around the first axis C1 as the nut member 140 is rotated in the direction of arrow F3 around the first axis C1 by the electric motor 84, from a state in which the cam engaging member 180 is engaged with the end portion of the second inclined cam groove portion 182e that is on the rear wheel 16 side, the drum cam 182 is moved along the second connecting groove portion 182g in the direction of the arrow F4, as shown in FIG. 17B. FIG. 17A is a view showing the position of the drum cam 182 when the fork shaft 102 is in the high gear position, and FIG. 17B is a view showing a position of the drum cam 182 that has moved farther in the direction of arrow F4 from the position it is in when the fork shaft 102 is in the high gear position. As shown in FIG. 17B, when the drum cam 182 moves farther in the direction of arrow F4 from the position it is in when the fork shaft 102 is in the high gear position, i.e., when the drum cam 182 moves farther in the direction of arrow F4 from the position it is in when the movement of the fork shaft 102 in the direction of arrow F4 is not allowed, the spring member 162 of the standby mechanism 144 is compressed, so urging force Fb in the direction opposite the direction of arrow F4 is applied to the drum cam 182 by the elastic restoring force of the spring member 162, as shown in FIG. 17B. Therefore, when the cam engaging member 180 is rotated in the direction of arrow F3 by the electric motor 84, from the state in which the cam engaging member 180 is engaged with the second connecting groove portion 182g as shown in FIG. 17B, the drum cam 182 moves in the direction opposite the direction of arrow F4 by the urging force Fb, and the cam engaging member 180 engages with the first switching cam groove portion 182c, as shown in FIG. 17C. Also, the alternate long and short dash line circle shown in FIGS. 17B and 17C indicates the position of the cam engaging member 180 in FIG. 17A.

With the transfer 178 structured as described above, when the cam engaging member 180 is rotated around the first axis C1 by the electric motor 84, the fork shaft 102 is moved from the high gear position to the low gear position or from the low gear position to the high gear position, by the cam groove 182a formed on the drum cam 182, and moreover, the transfer torque of the front-wheel drive clutch 50 is able to be adjusted while the fork shaft 102 remains in the high gear position or the low gear position.

As described above, with the transfer 178 of this example embodiment, the cam groove 182a formed on the drum cam 182 includes the first inclined cam groove portion 182b that extends in a direction inclined with respect to the third axis C3 of the fork shaft 102 and engages with the cam engaging member 180, and the first switching cam groove portion 182c that extends in a direction perpendicular to the third axis C3 of the fork shaft 102. Relative movement between the cam engaging member 180 and the drum cam 182 in the direction of the third axis C3 of the fork shaft 102 is prevented, regardless of rotation of the nut member 140 in the direction of arrow F3 around the first axis C1 of the rear-wheel side output shaft 44, by the second switching cam groove portion 182d. Therefore, when the nut member 140 is rotated in the direction of arrow F1 around the first axis C1 of the rear-wheel side output shaft 44, in a state in which the cam engaging member 180 is engaged with the first inclined cam groove portion 182b of the cam groove 182a formed on the drum cam 182, the drum cam 182 moves relative to the cam engaging member 180 in the direction of the third axis C3 of the fork shaft 102, and the high-low switching mechanism 48 switches to the low-speed gear L, for example. Moreover, when the cam engaging member 180 engages with the second switching cam groove portion 182d of the cam groove 182a when the high-low switching mechanism 48 has been switched to the low-speed gear L, relative rotation between the cam engaging member 180 and the drum cam 182 in the direction of the third axis C3 of the fork shaft 102 is prevented regardless of rotation of the nut member 140 in the direction of arrow F3 around the first axis C1 of the rear-wheel side output shaft 44. Therefore, the nut member 140 moves in the direction of the first axis C1 of the rear-wheel side output shaft 44 while the high-low switching mechanism 48 remains in the low-speed gear L to which it was switched, and the linear motion of the nut member 140 is transmitted to the front-wheel drive clutch 50 via the first transmitting mechanism 88d. As a result, transfer torque transmitted to the drive gear 46 is able to be adjusted by the front-wheel drive clutch 50, while the high-low switching mechanism 48 is in a state in which it has been switched to the low-speed gear L.

Also, with the transfer 178 of this example embodiment, the first switching cam groove portion 182c is provided on the end portion of the first inclined cam groove portion 182b that is on the rear wheel 16 side, and the second switching cam groove portion 182d is provided on the end portion of the first inclined cam groove portion 182b that is on the side opposite the rear wheel 16 side. Therefore, when the cam engaging member 180 engages with the first switching cam groove portion 182c or the second switching cam groove portion 182d as a result of the nut member 140 being rotated around the first axis C1 of the rear-wheel-side output shaft 44, the high-low switching mechanism 48 is able to switch to the high-speed gear H or the low-speed gear L. Moreover, while the cam engaging member 180 is engaged with the first switching cam groove portion 182c or the second switching cam groove portion 182d, even if the nut member 140 rotates around the first axis C1 of the rear-wheel-side output shaft 44, movement of the drum cam 182 in the direction of the third axis C3 of the fork shaft 102 is prevented, regardless of the rotation of the nut member 140 around the first axis C1 of the rear-wheel-side output shaft 44. As a result, transfer torque transmitted to the drive gear 46 can be adjusted by the front-wheel drive clutch 50 while the high-low switching mechanism 48 is in the high-speed gear H or the low-speed gear L.

Figure 18:
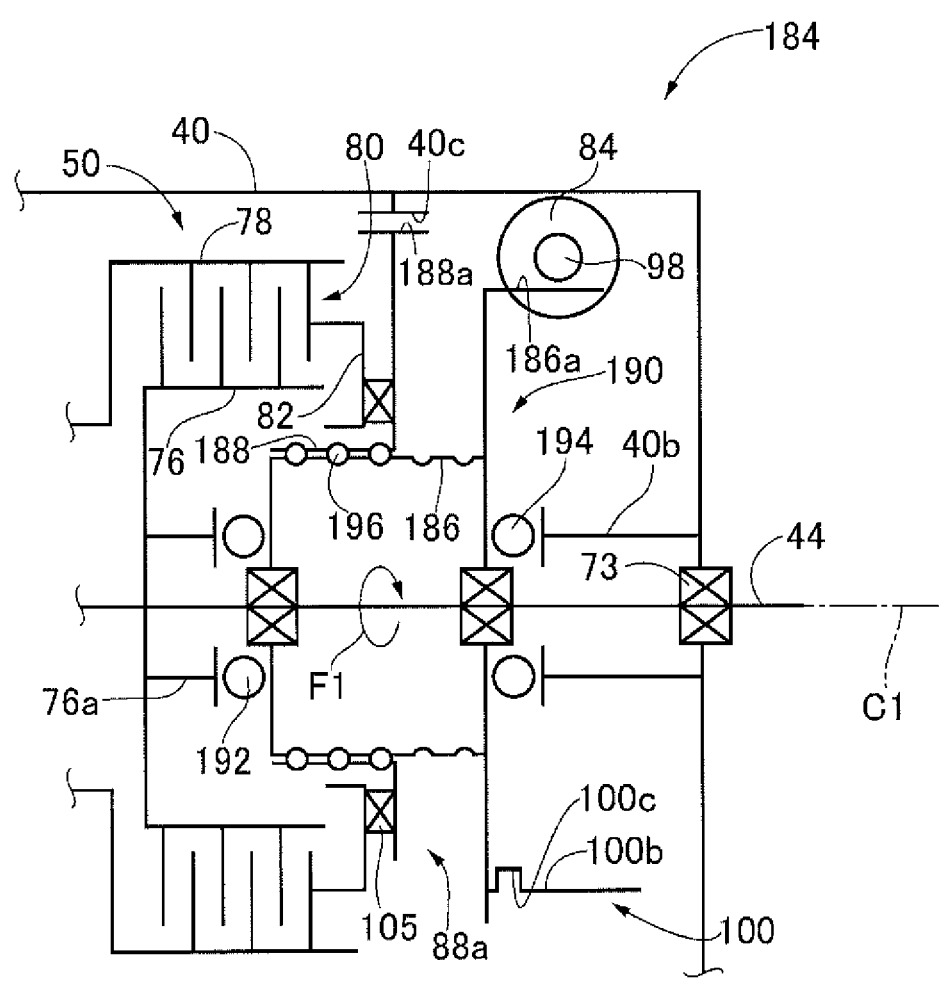
FIG. 18 is a skeleton view schematically showing the structure of a transfer according to a fourth example embodiment of the present disclosure.

Next, a fourth example embodiment of the present disclosure will be described. FIG. 18 is a view illustrating a transfer 184 according to this fourth example embodiment of the present disclosure. The transfer 184 of this example embodiment differs from the transfer 22 of the first example embodiment in that the structure of a screw mechanism 190 is modified so that a nut member 188 is moved in the direction of the first axis C1 of the rear-wheel side output shaft 44 by a threaded shaft member (one screw member) 186 being rotatably driven by the electric motor 84. As for the rest, the transfer 184 of this example embodiment is substantially the same as the transfer 22 of the first example embodiment.

As shown in FIG. 18, a protruding portion 76a that protrudes in a direction toward an end portion of the threaded shaft member 186 that is on the front wheel 14 side is formed on the clutch hub 76, and a first thrust bearing 192 is arranged between this protruding portion 76a and the end portion of the threaded shaft member 186 that is on the front wheel 14 side. Also, a protruding portion 40b that protrudes in a direction toward an end portion of the threaded shaft member 186 that is on the rear wheel 16 side is formed on the transfer case 40, and a second thrust bearing 194 is arranged between this protruding portion 40b and the end portion of the threaded shaft member 186 that is on the rear wheel 16 side. The threaded shaft member 186 is relatively rotatably supported by the rear-wheel side output shaft 44 via the needle bearing 97. That is, the threaded shaft member 186 is supported by the rear-wheel side output shaft 44 in a manner unable to move in the direction of the first axis C1 of the rear-wheel side output shaft 44 by the protruding portion 76a of the clutch hub 76 and the protruding portion 40b of the transfer case 40, and able to rotate around the first axis C1 of the rear-wheel side output shaft 44 by the needle bearing 97. A worm wheel 186a that meshes with a worm 98 formed on a motor shaft of the electric motor 84 is formed on the threaded shaft member 186, and the drum cam 100 is connected to the threaded shaft member 186.

Also, as shown in FIG. 18, inner peripheral spline teeth 40c are formed on the transfer case 40, and outer peripheral spline teeth 188a that spline engage with these inner peripheral spline teeth 40c are formed on the nut member 188. The nut member 188 screws together with the threaded shaft member 186 via a plurality of balls 196, and the screw mechanism 190 is a ball screw in which the nut member 188 and the threaded shaft member 186 operate via the plurality of balls 196. That is, the nut member 188 is supported by the transfer case 40 in a manner able to move in the direction of the first axis C1 of the rear-wheel side output shaft 44 and unable to rotate around the first axis C1 of the rear-wheel side output shaft 44, by the inner peripheral spline teeth 40c of the transfer case 40.

As a result, when the threaded shaft member 186 is rotatably driven by the electric motor 84, the nut member 188 moves in the direction of the first axis C1 of the rear-wheel side output shaft 44, and the linear motion of the nut member 188 is transmitted to the front-wheel drive clutch 50 via the first transmitting mechanism 88a. Moreover, when the threaded shaft member 186 is rotatably driven by the electric motor 84, the drum cam 100 that is connected to the threaded shaft member 186 rotates and the cam engaging member 103 that is engaged with the cam groove 100c moves in the direction of the third axis C3 of the fork shaft 102, and the linear motion of the cam engaging member 103 is transmitted to the high-low switching mechanism 48 via the second transmitting mechanism 88b.

As described above, according to the transfer 184 of this example embodiment, the nut member 188 is supported in a manner unable to rotate around the first axis C1 of the rear-wheel side output shaft 44, and the threaded shaft member 186 is supported in a manner unable to move in the direction of the first axis C1 of the rear-wheel side output shaft 44 and able to rotate around the first axis C1 of the rear-wheel side output shaft 44. In this way, when the threaded shaft member 186 is rotatably driven by the electric motor 84, the nut member 188 moves in the direction of the first axis C1 of the rear-wheel side output shaft 44, and the linear motion of the nut member 188 is transmitted to the front-wheel drive clutch 50 via the first transmitting mechanism 88a. Moreover, when the threaded shaft member 186 is rotatably driven by the electric motor 84, the drum cam 100 that is connected to the threaded shaft member 186 rotates and the cam engaging member 103 that is engaged with the cam groove 100c moves in the direction of the third axis C3 of the fork shaft 102, and the linear motion of the cam engaging member 103 is transmitted to the high-low switching mechanism 48 via the second transmitting mechanism 88e.

Heretofore, example embodiments of the present disclosure have been described in detail with reference to the drawings, but the present disclosure may also be applied in other forms.

For example, in the example embodiment described above, the transfer 22, 134, 178, 184 includes the front-wheel drive clutch 50 that adjusts the transfer torque to the drive gear 46, but a clutch, i.e., a dog clutch (a mesh clutch) that transmits or interrupts the transmission or some of the power from the rear-wheel side output shaft 44 to the drive gear 46 may be provided instead of the front-wheel drive clutch 50.

Also, in the example embodiment described above, a ball screw is given as an example of the screw mechanism 86, but the screw mechanism 86 is not limited to this. For example, as long as the screw mechanism 86 is a conversion mechanism that converts the rotational motion of the electric motor 84 into linear motion, the screw mechanism 86 may also be a mechanism such as the simple threaded shaft member 94 and the nut member 92 that directly screw together, which have been combined, for example. More specifically, the screw mechanism 86 may be a slip screw or the like. When the screw mechanism 86 is a slip screw, the mechanical efficiency with which rotational motion is converted into linear motion is lower than it is with a ball screw, but certain effects, such as that high thrust is able to be applied to the front-wheel drive clutch 50, and the stroke necessary to operate the high-low switching mechanism 48 is able to be obtained, are able to be obtained.

Also, in the example embodiment described above, the screw mechanism 86 is indirectly connected to the electric motor 84 via the worm gear 90, but the screw mechanism 86 is not limited to this. For example, the nut member 92 of the screw mechanism 86 and the electric motor 84 may be directly connected without using the worm gear 90. More specifically, the nut member 92 and the electric motor 84 may be directly connected such that a pinion provided on the motor shaft of the electric motor 84 meshes with gear teeth formed on the nut member 92.

Further, in the example embodiment described above, an FR-based four-wheel drive vehicle is given as an example of the vehicle 10 to which the transfer 22, 134, 178, 184 is applied, but the vehicle 10 to which the transfer 22, 134, 178, 184 is applied is not limited to this. For example, the vehicle 10 to which the transfer 22, 134, 178, 184 is applied may also be a front engine front wheel drive (FF)-based four-wheel drive vehicle. Also, the front-wheel drive clutch 50 is described as being a multiple disc clutch, but the present disclosure may also be applied when the front-wheel drive clutch 50 is a single disc clutch. Further, the transfer 22, 134, 178, 184 does not have to be provided with the gear position maintaining mechanism 120 and the low gear position detection switch 130.

Further, in the example embodiments described above, an internal combustion engine such as a gasoline engine or a diesel engine, for example, may be used as the engine 12 that given as an example of the driving force source. Also, another prime mover such as an electric motor, for example, may be used either alone or in combination with the engine 12, as the driving force source. Further, the transmission 20 is any one of a variety of automatic transmissions such as a planetary gear-type stepped transmission, a continuously variable transmission (CVT), or a synchronous mesh twin shaft parallel axis-type automatic transmission (including a known DCT), or a known manual transmission. Also, the front-side clutch 36 is described as being an electromagnetic dog clutch, but the front-side clutch 36 is not limited to this. For example, the front-side clutch 36 may also be a type of friction clutch, or a dog clutch that is provided with a shift fork that moves the sleeve in the axial direction, in which the shift fork is driven by an electrically controllable or hydraulically controllable actuator, or the like.

The example embodiments described above are no more than example embodiments. The present disclosure may be carried out in modes that have been modified or improved in any of a variety of ways based on the knowledge of one skilled in the art. For example, in the first example embodiment described above, the structure may also be such that the outer peripheral teeth 70a of the locking sleeve 70 do not mesh with the locking teeth 68 when the fork shaft 102 is in the low gear position, and the cam groove 182a of the drum cam 182 may be used instead of the cam groove 100c of the drum cam 100, as illustrated in the third example embodiment.

What is claimed is:

1. A transfer comprising:
an input shaft;
an output shaft;
an output member configured to output power to a different output destination than the output shaft;
a high-low switching mechanism configured to change a rate of rotation of the input shaft and transmit a resultant rotation to the output shaft, the high-low switching mechanism including a high-speed gear and a low-speed gear;
a clutch configured to transmit or interrupt a transmission of some of the power of the output shaft from the output shaft to the output member, or adjust transfer torque that is transmitted from the output shaft to the output member;
an actuator;
a screw mechanism that includes a threaded shaft member and a nut member that are a pair of screw members, the threaded shaft member and the nut member screwing together, the screw mechanism configured to rotatably drive one of the screw members, of the threaded shaft member and the nut member, around an axis of the output shaft with the actuator such that the nut member moves in a direction of an axis of the output shaft;
a first transmitting mechanism configured to transmit a movement of the nut member that is in the direction of the axis of the output shaft to the clutch;
a second transmitting mechanism including a second shaft, the second shaft being arranged parallel to the output shaft, the second shaft configured to move in a direction of an axis of the second shaft;
a cam engaging member that is connected to one of the second shaft and the one screw member; and
a drum cam that is connected to the other of the second shaft and the one screw member, the drum cam including a cam groove that engages with the cam engaging member, the drum cam configured to move relative to the cam engaging member in the direction of the axis of the second shaft, by rotation of the one screw member around the axis of the output shaft, wherein
the second transmitting mechanism is configured to transmit a movement, which is in the direction of the axis of the second shaft, of one of the drum cam and the cam engaging member that is connected to the second shaft to the high-low switching mechanism via the second shaft such that the high-low switching mechanism switches between the high-speed gear and the low-speed gear.

2. The transfer according to claim 1, wherein:
the cam groove of the drum cam includes an inclined cam groove portion and a switching cam groove portion;
the inclined cam groove portion extends in a direction inclined with respect to the axis of the second shaft or the axis of the output shaft;
the switching cam groove portion extends in a direction perpendicular to the axis of the second shaft or the axis of the output shaft, the switching cam groove portion is adapted to adjust the transfer torque that is transmitted from the output shaft to the output member; and
the switching cam groove portion is configured to prevent a relative movement of the cam engaging member and the drum cam in the direction of the axis of the second shaft regardless of rotation of the one screw member around the axis of the output shaft.

3. The transfer according to claim 2, wherein:
The switching cam groove portion includes a first switching cam groove portion and second switching cam groove portion;
the first switching cam groove portion is provided on one end portion of the inclined cam groove portion; and
the second switching cam groove portion is provided on the other end portion of the inclined cam groove portion.

4. The transfer according to claim 1, wherein:
the cam groove formed on the drum cam includes an inclined cam groove portion that extends in a direction inclined with respect to the axis of the output shaft or the axis of the second shaft; and
the drum cam is configured to move relative to the cam engagement member in the direction of the axis of the second shaft by the inclined cam groove portion, when the one screw member is rotated around the axis of the output shaft by the actuator, such that the drum cam moves in the direction of the axis of the second shaft by an amount of movement that is greater than an amount of movement of the nut member in the direction of the axis of the output shaft.

5. The transfer according to claim 1, wherein:
the cam engaging member is connected to the second shaft; and
the drum cam is connected to the one screw member.

6. The transfer according to claim 5, wherein:
the drum cam is connected to the nut member;
the nut member is supported in a manner able to rotate around the axis of the output shaft; and
the threaded shaft member is supported in a manner unable to move in the direction of the axis of the output shaft and unable to rotate around the axis of the output shaft.

7. The transfer according to claim 5, wherein:
the drum cam is connected to the threaded shaft member;
the nut member is supported in a manner unable to rotate around the axis of the output shaft; and
the threaded shaft member is supported in a manner unable to move in the direction of the axis of the output shaft and able to rotate around the axis of the output shaft.

8. The transfer according to claim 5, wherein:
an output shaft support bearing that rotatably supports an end portion of the output shaft that is on the drum cam side, from among both end portions of the output shaft, is arranged inside the drum cam within a length range of the drum can in the direction of the axis of the output shaft.

9. The transfer according to claim 1, wherein:
the actuator is connected to the nut member of the screw mechanism via a worm gear;
the cam engaging member is connected to a worm wheel of the worm gear;
the drum cam is connected to the second shaft; and
the drum cam has a partial cylindrical shape that follows an outer periphery of the worm wheel.

10. The transfer according to claim 1, wherein the second transmitting mechanism includes a standby mechanism that transmits a movement of the cam engaging member or a movement of the drum cam, in the direction of the axis of the second shaft, to the second shaft via a spring member.

11. The transfer according to claim 1, wherein the nut member screws together with the threaded shaft member via a plurality of balls.

12. The transfer according to claim 1, wherein:
   the clutch is one of a single disc clutch and a multiple disc clutch; and
   the clutch is configured to adjust the transfer torque to the output member.

* * * * *